(12) United States Patent
Futa et al.

(10) Patent No.: US 7,739,504 B2
(45) Date of Patent: Jun. 15, 2010

(54) SIGNATURE GENERATION APPARATUS AND SIGNATURE VERIFICATION APPARATUS

(75) Inventors: Yuichi Futa, Osaka (JP); Shingo Hasegawa, Miyagi (JP); Shuji Isobe, Miyagi (JP); Motoji Ohmori, Osaka (JP); Hiroki Shizuya, Miyagi (JP)

(73) Assignee: Panasonic Corporation, Osaka (JP)

( * ) Notice: Subject to any disclaimer, the term of this patent is extended or adjusted under 35 U.S.C. 154(b) by 911 days.

(21) Appl. No.: 11/578,432

(22) PCT Filed: Mar. 14, 2006

(86) PCT No.: PCT/JP2006/305000
§ 371 (c)(1),
(2), (4) Date: Oct. 17, 2006

(87) PCT Pub. No.: WO2006/114948
PCT Pub. Date: Nov. 2, 2006

(65) Prior Publication Data
US 2008/0282089 A1    Nov. 13, 2008

(30) Foreign Application Priority Data
Apr. 18, 2005  (JP) ............................ 2005-120094

(51) Int. Cl.
*H04L 9/30* (2006.01)
(52) U.S. Cl. .................... 713/170; 713/180; 380/30
(58) Field of Classification Search .............. 380/28, 380/30; 708/491; 713/176
See application file for complete search history.

(56) References Cited

U.S. PATENT DOCUMENTS 6,081,597 A    6/2000  Hoffstein et al.

2003/0120929 A1*  6/2003  Hoffstein et al. ............ 713/176
2004/0151309 A1*  8/2004  Gentry et al. ................. 380/30

(Continued)

FOREIGN PATENT DOCUMENTS

JP        2000-516733        12/2000

(Continued)

OTHER PUBLICATIONS

Sung Min et al., On the security of NTRUSign signature scheme, vol. I of II, Jan. 2004, pp. 625-630.

(Continued)

*Primary Examiner*—Gilberto Barron, Jr.
*Assistant Examiner*—Shaun Gregory
(74) *Attorney, Agent, or Firm*—Wenderoth, Lind & Ponack, L.L.P.

(57) ABSTRACT

A signature generation apparatus and a signature verification apparatus which can prevent the occurrence of norm zero vector forgery attack. The signature generation apparatus (110) includes a signature generation unit (114) which generates signature data (S) for a message (m) using a private key stored in a private key storage unit (112), and converts the format of the signature data (S) so that the first sub-element of the N sub-elements in the signature data (S) indicates 0 without changing the norm of the signature data (S). The signature verification apparatus (120) includes a signature verification unit (124) which judges whether or not the first sub-element of the N sub-elements included in the signature data (S) indicates 0, and determines the signature data (S) as unauthorized data when judging that it is not 0.

18 Claims, 12 Drawing Sheets

U.S. PATENT DOCUMENTS

2009/0070590 A1* 3/2009 Hoffstein et al. ............ 713/180

FOREIGN PATENT DOCUMENTS

WO   98/08323   2/1998
WO   03/050998  6/2003

OTHER PUBLICATIONS

S. Min et al., Weak Property of Malleability in NTRU Sign, Lecture Notes in Computer Science, vol. 3108, Jul. 2004, pp. 379-390.

Jeffrey Hoffstein et al., "NTRU: A Ring-Based Public Key Cryptosystem," Lecture Notes in Computer Science, 1423, Springer-Verlag, 1998, pp. 267-288.

Jeffrey Hoffstein et al., "NSS: An NTRU Lattice-Based Signature Scheme," Advances in Cryptology-Eurocrypt '01, LINCS, vol. 2045, Springer-Verlag, pp. 127-137.

Jeffrey Hoffstein et al., "NTRUSign: Digital Signatures Using the NTRU Lattice," CT-RSA '03, LNCS, vol. 2612, Springer-Verlag, 2003, pp. 122-140.

* cited by examiner

SIGNATURE GENERATION APPARATUS AND SIGNATURE VERIFICATION APPARATUS

TECHNICAL FIELD

The present invention relates to an encryption technology as an information security technology, and in particular to a signature generation apparatus and a signature verification apparatus which perform processing based on a digital signature.

BACKGROUND ART

A digital signature scheme, which is a kind of public key cryptosystem, is provided as a technology for preventing a sender from being identified and data from being tempered during the transmission of the data from a receiving apparatus to a transmitting apparatus.

In the digital signature scheme, the transmitting apparatus generates signature data for the data to be transmitted, using a private key of the transmitting apparatus, and transmits the data and the signature data to the receiving apparatus. The receiving apparatus verifies the signature data using a public key of the transmitting apparatus, and judges whether or not the data has been tampered (e.g. see Non-Patent Reference 1). Note that it is difficult to calculate a value of the private key using the public key.

An NTRU (a trademark of NTRU cryptosystems, Inc.) cryptosystem was proposed as a public key cryptosystem capable of high-speed processing (e.g. see Non-Patent Reference 2). In the NTRU cryptosystem, encryption and decryption are performed using polynomial operations which enable computation at a speed higher than the speed achieved in RSA (Rivest Shamir Adleman) cryptosystem, in which modulo exponentiation is performed under certain modulo, and also higher than the speed achieved in an elliptic-curve cryptosystem in which scalar multiplications are performed on points on an elliptic curve. It is therefore possible to perform processing of a higher speed than the existing public key cryptosystems, and software processing can be carried out within a practical period of time.

Thus, encrypted communication systems using the NTRU cryptosystem for a public key cryptosystem have an advantage in that processing between a transmitting apparatus and a receiving apparatus can be performed at a speed higher than those achieved in the encrypted communication systems using the existing public key cryptosystem.

The method suggested in the Non-Patent Reference 2 is a confidentiality cryptosystem for encrypting data; however, later on, a digital signature scheme based on the NTRU cryptosystem is proposed (e.g. see Non-Patent Reference 3). This digital signature scheme has been modified several times due to the arrival of decryption methods.

The following briefly describes a digital signature scheme called NTRUSign (hereinafter referred to as "NTRUSign signature scheme") (e.g. see Patent Reference 1 and Non-Patent Reference 4).

<NTRUSign Signature Scheme>

(1) Parameters in NTRUSign Signature Scheme

In the NTRUSign signature scheme, non-negative integer parameters such as N, q, df, dg and Normbound are used. The following explains the meanings of these parameters.

(i) Parameter N

The NTRUSign signature scheme is a digital signature scheme which performs signature generation and signature verification using polynomial operations. The degree of polynomials used in the NTRUSign signature scheme is determined by the parameter N mentioned above.

The polynomials used in the NTRUSign signature scheme are integer coefficient polynomials of degree (N−1) or lower with respect to the parameter N, e.g. $X^4+X^3+1$ when N=5. Here, "$X^a$" shall denote the a th power of X. Also, a public key h and a signature s are both expressed as polynomials of degree (N−1) or lower. A private key is a set of four pair polynomials (f, g, F, G) of degree (N−1) or lower. That is to say, f, g, F and G are all polynomials of degree (N−1) or lower. Note that, hereinafter, a set of (f, g, F, G) made up of four polynomials may be represented as {(f, g), (F, G)}, in some cases, regarding the set to be made up of two pairs of (f, g) and (F, G).

A polynomial operation is computed so that the computation always results in a polynomial of degree (N−1) or lower, using the relational expression $X^N=1$ with respect to the parameter N. For example, assuming that × presents a product of a polynomial and a polynomial, and "·" presents a product of an integer and a polynomial (or a product of an integer and an integer), when N=5, a product of the polynomial $X^4+X^2+1$ and the polynomial $X^3+X$ is computed as indicated below, using the relational expression $X^5=1$, so that the computation always results in a polynomial of degree N−1 or lower.

$$(X^{\wedge}4 + X^{\wedge}2 + 1) \times (X^{\wedge}3 + X) = X^{\wedge}7 + 2 \cdot X^{\wedge}5 + 2 \cdot X^{\wedge}3 + X$$

$$= X^{\wedge}2 \cdot 1 + 2 \cdot 1 + 2 \cdot X^{\wedge}3 + X$$

$$= 2 \cdot X^{\wedge}3 + X^{\wedge}2 + X + 2$$

Note that, in the NTRUSign signature scheme, a polynomial a of degree (N−1) expressed as $a = a\_0 + a\_1 \cdot X + a\_2 \cdot X^2 + \ldots + a\_(N-1) \cdot X^{(N-1)}$ is identified as a vector $(a\_0, a\_1, a\_2, \ldots, a\_(N-1))$. Here, $a\_0, a\_1, a\_2, \ldots, a\_(N-1)$ are coefficients of the polynomial a, and are integer numbers.

(ii) Parameter q

In the NTRUSign signature scheme, a parameter q, which is an integer number of 2 or greater, is used. The coefficients in a polynomial that appears in the NTRUSign signature scheme obtain remainder modulo q.

(iii) Parameters df and dg

The method for selecting a polynomial f which is a part of the private keys used in the NTRUSign signature scheme and a polynomial g to be used together with the polynomial f for generating a public key polynomial h is determined based on the parameters df and dg.

First, the polynomial f is selected so that df coefficients indicate "1", and other coefficients indicate "0". In other words, the polynomial f is a polynomial of degree (N−1) or lower, having N coefficients that range from coefficients of degree 0 (constant term) to degree (N−1), and the polynomial f is selected so that df coefficients indicate "1", and (N−df) coefficients indicate "0" out of such N coefficients. The polynomial g is then selected so that dg coefficients indicate "1", and other coefficients indicate "0".

(iv) Parameter Normbound

In the NTRUSign signature scheme, a distance between a 2·N-degree vector created from the signature s, and a 2·N-degree vector which is a hash value of message data (hereinafter simply referred to as "message") is calculated, and whether or not the signature s is an authorized signature is judged based on the distance. Normbound is a threshold value to be used for the judgment. That is to say, in the case where the distance is smaller than Normbound, the signature s is accepted as an authorized signature, while in the case where the distance equals to or greater than Normbound, the signature s is denied as an unauthorized signature. Note that the Non-Patent Reference 4 introduces an example of (N, q, df, dg, Normbound)=(251, 128, 73, 71, 310) as an example of the parameters in the NTRUSign signature scheme.

(2) Hash Value of Message and Distance Between Norm and Vector

In the NTRUSign signature scheme, a signature is created for a hash value of a message. The hash value of the message is a pair of polynomials of degree N, and is identified as a 2·N-degree vector. Note that the Non-Patent Reference 1 describes in detail hash function for deriving a hash value based on a message.

In the NTRUSign signature scheme, a distance between vectors is used in signature verification, and a norm (Centered norm) is used for the calculation of such a distance. The following defines a distance between a norm and a vector.

A norm $\|a\|$ of the polynomial $a=a\_0+a\_1 \cdot X+a\_2 \cdot X^2+ \ldots +a\_(N-1) \cdot X^{(N-1)}$ is defined as below.

$$\|a\|=\text{sqrt}((a\_0-\mu)^2+(a\_1-\mu)^2+\ldots+(a\_(N-1)-\mu)^2)$$

$$\mu=(1/N) \cdot (a\_0+a\_1+a\_2+\ldots+a\_(N-1))$$

Here, sqrt(x) shows a square root of x.

A norm $\|(a,b)\|$ of the pair (a,b) for the polynomials a and b is defined as indicated below.

$$\|(a,b)\|=\text{sqrt}(\|a\|^2+\|b\|^2)$$

A distance (inter-vector distance) between the pair (a,b) of the polynomials a and b and the pair (c,d) of the polynomials c and d is defined as $\|(c-a, d-b)\|$.

(3) Key Generation in the NTRUSign Signature Scheme

As described above, in the NTRUSign signature scheme, the polynomials f and g are generated at random using the parameters df and dg. As is described in the Non-Patent Reference 4, the polynomial h is generated using the polynomial Fq which satisfies Fq×f=1(mod q) by the expression h=Fq×g(mod q). Moreover, the polynomials F and G with small norms are derived so as to satisfy the following expression.

$$f \times G - g \times F = q$$

Here, it is assumed that {(f,g), (F,G)} denotes a private key and h denotes a public key. The private key is a key for generating a signature and is also called a signature generation key. The public key is a key for verifying the signature and is also called a signature verification key.

Here, x=y(mod q) is an operation which obtains, as the coefficient of i th degree in the polynomial x, a remainder obtained when the coefficient of i th degree in the polynomial y is divided by q so that the remainder indicates a value ranging from 0 to (q−1) (0≦i≦N−1). That is to say that it is an operation which obtains, as the polynomial x, a polynomial to which the (mod q) operation is performed so that each of the coefficients in the polynomial y indicates a value ranging from "0" to "(q−1)".

(4) Signature Generation in the NTRUSign Signature Scheme

In the signature generation according to the NTRUSign signature scheme, a signature s of a message m for which a signature should be generated is calculated. First, a 2·N-degree vector (m1, m2) (m1 and m2 are polynomials of degree N), which is a hash value for the message m, is calculated.

The polynomials a, b, A and B are calculated so as to satisfy the expression below using the 2·N-degree vector (m1, m2) and the private key {(f,g), (F, G)}.

$$G \times m1 - F \times m2 = A + q \times B$$

$$-g \times m1 + f \times m2 = a + q \times b$$

Here, it is presumed that each of the coefficients in the polynomials A and a is remainder obtained when divided by q so that the remainder indicates a value ranging from "<−q/2>+1" to "<q/2>". In other words, in the case where the remainder obtained when divided by q indicates a value ranged from "<q/2>" to "q−1", the remainder is adjusted through the subtraction of q so as to fall within the above-mentioned range. Here, <x> indicates the largest value within the values indicating x or smaller. For example, <−½>=−1.

Next, polynomials s and t are calculated using the expressions below, and the polynomial s is outputted as a signature.

$$s = f \times B + F \times b \pmod{q}$$

$$t = g \times B + G \times b \pmod{q}$$

FIG. 1 is a diagram for describing how to generate a signature s.

In the NTRUSign signature scheme, a nearest-neighbor lattice point P of a hash value H(m)=(m1, m2) for the message m is derived based on the above expressions s=f×B+F×b (mod q) and t=g×B+G×b (mod q), on a lattice of degree 2·N extended by a private key sequence {(f, g), (F, G)}. That is to say, a lattice point that is the nearest to (m1, m2) is found out as the nearest-neighbor lattice point P. Then, only the polynomial s of a signature vector (s, t) indicating the nearest-neighbor lattice point P is treated as a signature.

(5) Signature Verification in the NTRUSign Signature Scheme

In the signature verification according to the NTRUSign signature scheme, whether or not the signature s is an authorized signature of the message m for which the signature s has been generated is verified. First, a 2·N-degree vector (m1, m2) which is a hash value for a message m is calculated.

The polynomial t is calculated based on the following expression using the public key h.

$$t = s \times h \pmod{q}$$

A distance between the 2·N-degree vectors (s, t) and (m1, m2) is obtained, and whether or not the distance is smaller than Normbound is checked. In the case where the distance is smaller than Normbound, the signature s is judged to be authorized and then accepted. In the case where the distance equals to or greater than Normbound, the signature s is judged to be unauthorized and then denied.

FIG. 2 is a diagram for describing a method for verifying a signature s.

In the NTRUSign signature scheme, the lattice point P (s, t) in the 2·N-degree lattice extended by a public key sequence {(1, h), (0, q)} is derived based on the above-mentioned expression t=s×h (mod q) using the signature s and the public key h. Here, in such a 2·N-degree lattice, it is judged whether or not the hash value H(m)=(m1, m2) for a message m is within a hypersphere whose radius equals to Normbound with the lattice point P(s, t) in the center. In the case where the hash value is within the hypersphere, the signature s is judged to be authorized and then accepted, whereas in the case where the hash value is not within the hypersphere, the signature s is judged to be unauthorized and then denied.

Patent Reference 1: International Publication Bulletin No. 03/050998.

Non-Patent Reference 1: Tatsuaki Okamoto, and Hirosuke Yamamoto, Modern Cryptography, Sangyo Tosho, 1997.

Non-Patent Reference 2: Silverman, "NTRU: A ring based public key cryptosystem", Lecture Notes in Computer Science, 1423, pp. 267-288, Springer-Verlag, 1998.

Non-Patent Reference 3: J. Hoffstein, J. Pipher and 3. Silverman, "NSS: An NTRU Lattice-Based Signature Scheme", Advances in Cryptoplogy-Eurocrycpt '01, LINCS, Vol. 2045, pp. 123-137, Springer-Verlag, 2001.

Non-Patent Reference 4: J. Hoffstein, N. Graham, J. Pipher, J. Silverman and W. Whyte, "NTRUSign: Digital Signatures Using the NTRU Lattice", CT-RSA '03, LNCS, Vol. 2612, pp. 122-140, Springer-Verlag, 2003.

Patent Reference 5: S. Min, G. Yamamoto and K. Kim, "On the security of NTRUSign signature scheme", SCIS2004.

DISCLOSURE OF INVENTION

Problems that Invention is to Solve

However, in the NTRUSign signature scheme disclosed in the Patent Reference 1 and the Non-Patent Reference 4, there is a problem that a signature can be forged.

Specifically, in the conventional NTRUSign signature scheme, there is a possibility that, even in the case where a norm 0 vector is added to an authorized signature s, the signature s to which the norm 0 vector is added is verified as the authorized signature.

The norm zero vector is a vector whose norm is zero. For example, the norm zero vector is a vector in which all elements indicate "1".

The norm of the vector $v0=(1, 1, \ldots, 1)$ having elements which all indicate "1" is given as follows based on the definition of norm.

$$\|v0\|=sqrt((1-\mu)^2+(1-\mu)^2+\ldots+(1-\mu)^2)=0$$

Here, when $\mu=(1/N)\cdot(1+1+1+\ldots+1)=1$ is given, $$\|v0\|=sqrt((1-1)^2+(1-1)^2+\ldots+(1-1)^2)=0$$

is obtained.

In other words, the norm of the forged signature $(s+v0)$ generated by adding the norm zero vector $v0$ to the signature s is equal to the norm of the signature s. Therefore, the distance between $(s+v0, t)$ and $(m1, m2)$ are equal to the distance between $(s, t)$ and $(m1, m2)$. As a result, the forged signature $(s+v0)$ is verified as an authorized signature at the time of signature verification. Hereinafter, an attack to the signature s by an addition of the norm zero vector is referred to as "norm zero vector forgery attack". Note that, Non-Patent Reference 5 indicates such attack.

The present invention is conceived of such problem and has an object to provide a signature generation apparatus and a signature verification apparatus which can prevent the occurrence of norm zero vector forgery attack.

Means to Solve the Problems

In order to achieve the aforementioned object, a signature generation apparatus of the present invention is a signature generation apparatus which generates signature data for message data, using a signature scheme, wherein the signature scheme includes: a key generation step of generating elements f and g of a ring R and an element Fq, with respect to the ring R and a positive integer q, the ring R being a set of N-dimensional arrays and defining addition, subtraction, multiplication and a norm which indicates a size of an element, the element Fq being an inverse number of f(mod q) which denotes a remainder obtained when f is divided by q, generating, as a public key, an element h which is congruent, modulo q, to a product which is derived as a result of multiplying the element f and the element Fq, generating elements F and G so as to satisfy $f \times G - g \times F = q$, where "×" denotes multiplication of the ring R, and generating, as a private key, a set $\{f, g, F, G\}$ which includes the four elements of f, g, F and G; and a signature generation step of generating the signature data for the message data, using the private key, the signature data being an element of the ring R; and a signature verification step of verifying the signature data using the public key. Here, the signature generation apparatus includes: a signature generation unit which generates the signature data for the message data using the private key, the signature data being the element of the ring R; and a signature conversion unit which converts a format of the signature data without changing a norm of the signature data, so that a target sub-element indicates a predetermined value, the target sub-element being one of N sub-elements included in the signature data.

Accordingly, the format of the signature data generated by the NTRUSign signature scheme is converted into the format in which a target sub-element indicates a predetermined value without a norm of the target sub-element is changed. Therefore, the signature verification apparatus which obtains the signature data and the message data can perform signature verification on the obtained signature data using the NTRUSign signature scheme, and can also easily judge, based on the format of the signature data, whether or not a norm zero vector forgery attack is occurred. For example, in the case where the format of the signature data is converted so that the first element of the N sub-elements included in the signature data indicates "0", if the norm zero vector forgery attack is occurred to the signature data, the target sub-element indicates a value which is not "0". Thus, the signature verification apparatus can easily prevent the occurrence of norm zero vector forgery attack by only judging whether or not the first sub-element of the target signature data indicates "0". As a result, security level of the digital signature is increased.

Furthermore, the signature generation apparatus includes a hash value generation unit which generates two N-dimensional arrays indicating a hash value for the message data, and to convert a format of each of the two N-dimensional arrays without changing a norm of the N-dimensional array so that a target sub-element indicates a predetermined value, the target sub-element being one of N sub-elements included in the N-dimensional array, wherein the signature generation unit is operable to generate the signature data, using the hash value whose format has been converted by the hash value generation unit and the private key in which a format of each element of the set $\{f, g, F, G\}$ is adjusted so that a target sub-element indicates a predetermined value, the target sub-element being one of the N sub-elements included in each element.

Accordingly, two N-degree arrangements which indicate a hash value and four elements of f, g, F and G which indicate private keys respectively have a target sub-element which indicates a predetermined value. Therefore, even in the case where the norm zero vector is added, the addition can be easily detected and the security level of the digital signature can be assuredly increased.

Furthermore, a signature verification apparatus of the present invention is a signature verification apparatus which verifies signature data for message data, using a signature scheme, wherein the signature scheme includes: a key generation step of generating elements f and g of a ring R and an element Fq, with respect to the ring R and a positive integer q, the ring R being a set of N-dimensional arrays and defining addition, subtraction, multiplication and a norm which indicates a size of an element, the element Fq being an inverse number of f(mod q) which denotes a remainder obtained when f is divided by q, generating, as a public key, an element h which is congruent, modulo q, to a product which is derived as a result of multiplying the element f and the element Fq, generating elements F and G so as to satisfy f×G−g×F=q, where "×" denotes multiplication of the ring R, and generating, as a private key, a set {f, g, F, G} which includes the four elements of f, g, F and G; and a signature generation step of generating the signature data for the message data, using the private key, the signature data being an element of the ring R; and a signature verification step of verifying the signature data using the public key. Here, the signature verification apparatus includes: a signature format judgment unit which judges whether or not a target sub-element indicates a predetermined value, and when judging that the target sub-element does not indicate the predetermined value, determines the signature data as unauthorized data, the target sub-element being one of N sub-elements included the signature data; and a signature verification unit which verifies the signature data which is an element of the ring R, using the public key.

For example, in the case where the format of the signature data generated by the NTRUSign signature scheme is converted into the format in which a target sub-element indicates a predetermined value without a norm of the target sub-element is changed, the signature verification apparatus can perform signature verification on the obtained signature data using the NTRUSign signature scheme, and can also easily judge, based on the format of the signature data, whether or not a norm zero vector forgery attack is occurred. For example, in the case where the format of the signature data is converted so that the first sub-element of the N sub-elements included in the signature data indicates "0", if the norm zero vector forgery attack is occurred to the signature data, the target sub-element indicates a value which is not 0. Thus, the signature verification apparatus can easily prevent the occurrence of norm zero vector forgery attack by only judging whether or not the first sub-element of the target signature data indicates "0". As a result, security level of the digital signature can be increased.

Furthermore, the signature verification unit includes: a hash value generation unit which generates two N-dimensional arrays indicating a hash value for the message data, and converts a format of each of the two N-dimensional arrays without changing a norm of the N-dimensional array so that a target sub-element indicates a predetermined value, the target sub-element being one of the sub-elements included in the N-dimensional array; a signature vector generation unit which: calculates, as an element t of the ring R, a product of the signature data and the public key in which a format is adjusted so that the target sub-element indicates a predetermined value, the target sub-element being one of N sub-elements included in the element h; converts a format of the element t without changing a norm of the element t so that a target sub-element indicates a predetermined value, the target sub-element being one of N sub-elements included in the element t; and generates a signature vector which is made up of the signature data and the element t whose format has been converted; and a distance judgment unit which verifies the signature data based on a distance between the signature vector generated by the signature vector generation unit and the hash value whose format has been converted by the hash value generation unit.

Accordingly, respective target sub-elements included in two N-degree arrangements indicating a hash value, an element h indicating a public key and an element t indicate a predetermined value so that even in the case where the norm zero vector is added to the target sub-elements, the addition can be easily detected. Consequently, the security level of the digital signature can be assuredly increased.

It should be noted that the present invention can be realized not only as such signature generation apparatus and signature verification apparatus, but also as a method and a program thereof as well as a recording medium storing the program and as an integrated circuit.

EFFECTS OF THE INVENTION

A signature generation apparatus and a signature verification apparatus of the present invention have an operational effect of being capable of preventing the occurrence of norm zero vector forgery attack, and therefore the present invention is significantly useful.

NUMERICAL REFERENCES

Figure 1:
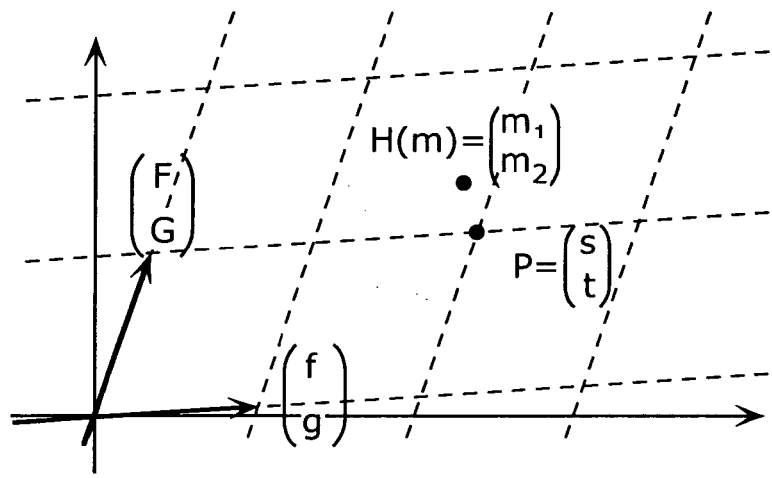
FIG. 1 is a diagram for describing a method of generating a signature.
Figure 2:
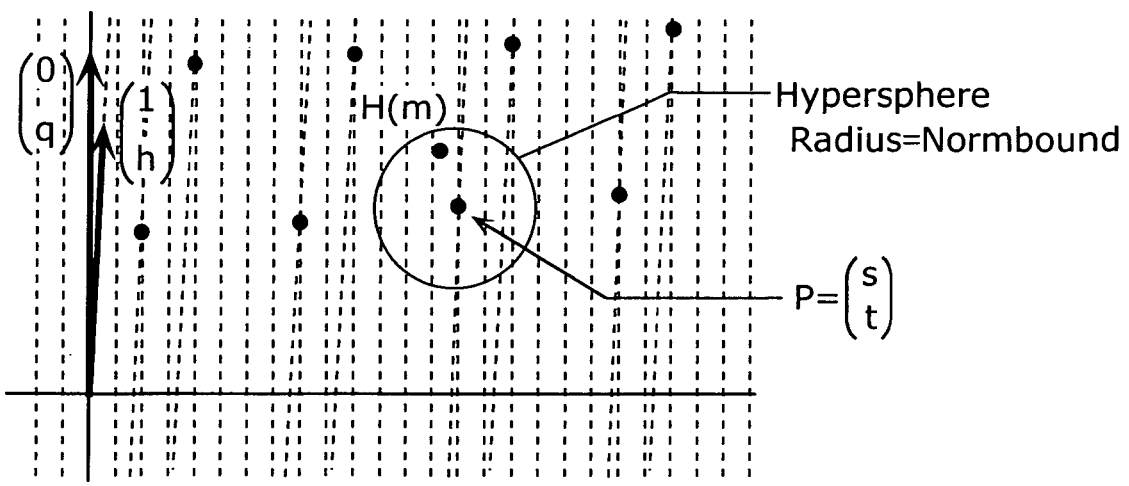
FIG. 2 is a diagram for describing a method of verifying a signature.

100 Digital signature system
110 Signature generation apparatus

111 Transmission unit
112 Private key storage unit
113 Public key certificate storage unit
114 Signature generation unit
115 Signature data set generation unit
120 Signature verification apparatus
121 Reception unit
122 CA public key storage unit
123 Signature data set storage unit
124 Signature verification unit
130 Communication path
1141 Hash value generation unit
1142 Signature vector generation unit
1143 Signature conversion unit
1241 Hash value generation unit
1242 Signature format judgment unit
1243 Signature vector generation unit
1244 Distance judgment unit

BEST MODE FOR CARRYING OUT THE INVENTION

Embodiment

An improved NTRUSign signature scheme according to the embodiment of the present invention is an improved version of the conventional NTRUSign signature scheme, for generating a signature in such a manner that the occurrence of norm zero vector forgery attack can be prevented, and verifying the generated signature.

The following describes in detail the improved NTRUSign signature scheme according to the present embodiment.

<Improved NTRUSign Signature Scheme>

(1) Parameters in NTRUSign Signature Scheme

In the improved NTRUSign signature scheme, the non-negative integer parameters such as N, q, df, dg and Normbound are used. The definitions of these parameters are as same as those given by the conventional NTRUSign signature scheme. The following describes the meanings of these parameters.

(i) Parameter N

The improved NTRUSign signature scheme is a digital signature scheme which performs signature generation and signature verification using polynomial operations. The degree of polynomials used in the improved NTRUSign signature scheme is determined by the parameter N described above.

The polynomials used in the improved NTRUSign signature scheme are integer coefficient polynomials of degree N−1 or lower with respect to the parameter N. For example, they are polynomials $X^4+X^3+1$ when N=5. Here, "$X^a$" shall denote the "a" th power of X. Also, a public key h and a signature s are both expressed as polynomials of degree (N−1) or lower. A private key is a set of four polynomials {f, g, F, G} of degree (N−1) or lower. In other words, f, g, F and G are all polynomials of degree N−1 or lower. Note that, hereinafter, a set of (f, g, F, G) made up of four polynomials may be represented as {(f, g), (F, G)}, in some cases, regarding the set to be made up of two pairs of (f, g) and (F, G).

A polynomial operation is computed so that the result of the computation always results in a polynomial of degree (N−1) or lower, using the relational expression $X^N=1$ with respect to the parameter N. For example, assuming that "×" presents a product of a polynomial and a polynomial, and "·" presents a product of an integer and a polynomial (or a product of an integer and an integer), when N=5, a product of the polynomial $X^4+X^2+1$ and the polynomial $X^3+X$ is operated so as to result in a polynomial of degree N−1 or lower, as indicated below, based on the expression $X^5=1$.

$$(X^4+X^2+1) \times (X^3+X) = X^7+2 \cdot X^5+2 \cdot X^3+X$$
$$= X^2 \cdot 1+2 \cdot 1+2 \cdot X^3+X$$
$$= 2 \cdot X^3+X^2+X+2$$

Note that, in the improved NTRUSign signature scheme, a polynomial a of degree (N−1) expressed as $a=a\_0+a\_1 \cdot X+a\_2 \cdot X^2+ \ldots +a\_(N-1) \cdot X^{(N-1)}$ is identified as a vector (a_0, a_1, a_2, ..., a_(N−1)). Here, a_0, a_1, a_2, ..., a_(N−1) are coefficients of the polynomial a, and are integer numbers.

(ii) Parameter q

In the improved NTRUSign signature scheme, a parameter q which is an integer number of 2 or greater is used. The coefficients in a polynomial that appears in the improved NTRUSign signature scheme obtain a remainder modulo q.

(iii) Parameters df and dg

The method for selecting a polynomial f which is a part of the private key used in the improved NTRUSign signature scheme as well as a polynomial g to be used together with the polynomial f for generating a public key polynomial h is determined based on the parameters df and dg.

First, the polynomial f is selected so that df coefficients indicate "1", and other coefficients indicate "0". In other words, the polynomial f is a polynomial of degree (N−1) or lower, having N coefficients that range from coefficients of degree 0 (constant term) to degree (N−1), and the polynomial f is selected so that df coefficients indicate "1", and (N−df) coefficients indicate "0" out of such N coefficients. Then, the polynomial g is selected so that dg coefficients indicate "1", and other coefficients indicate "0".

(iv) Parameter Normbound

In the improved NTRUSign signature scheme, a distance between a 2·N-degree vector created from the signature s and a 2·N-degree vector which is a hash value of message data (hereinafter simply referred to as "message") is calculated, and whether or not the signature s is an authorized signature is judged based on the distance. Normbound is a threshold to be used for such a judgment. That is to say, in the case where the distance is smaller than Normbound, the signature s is accepted as an authorized signature, while in the case where the distance equals to or greater than Normbound, the signature s is denied as an unauthorized signature. Note that the Non-Patent Reference 4 shows an example of (N, q, df, dg, Normbound)=(251, 128, 73, 71, 310) as an example of the parameters in the NTRUSign signature scheme. In the improved NTRUSign signature scheme, the same parameters as shown in the above-mentioned example may be used.

(2) Hash Value of Message and Distance Between Norm and Vector

In the improved NTRUSign signature scheme, a signature is created for a hash value of a message. The hash value of a message is a pair of polynomials of degree N, and is identified as a 2·N-degree vector. Note that the Non-Patent Reference 1 describes in detail hash function for obtaining a hash value based on a message.

In the improved NTRUSign signature scheme, a distance between vectors is used for signature verification, and a norm (Centered norm) is used for the calculation of such a distance, as in the conventional NTRUSign signature scheme. The following defines a distance between a norm and a vector.

A norm ∥a∥ of the polynomial $a = a\_0 + a\_1 \cdot X + a\_2 \cdot X^2 + \ldots + a\_(N-1) \cdot X^{(N-1)}$ is defined as below.

$$\|a\| = \mathrm{sqrt}((a\_0-\mu)^2 + (a\_1-\mu)^2 + \ldots + (a\_(N-1)-\mu)^2)$$

$$\mu = (1/N) \cdot (a\_0 + a\_1 + a\_2 + \ldots + a\_(N-1))$$

Here, sqrt(x) shows a square root of x.

A norm ∥(a, b)∥ of the pair (a, b) for the polynomials a and b is defined as below.

$$\|(a,b)\| = \mathrm{sqrt}(\|a\|^2 + \|b\|^2)$$

A distance (inter-vector distance) between the pair (a, b) of the polynomials a and b and the pair (c, d) of the polynomials c and d is defined as ∥(c−a, d−b)∥.

(3) Key Generation in the Improved NTRUSign Signature Scheme

In the improved NTRUSign signature scheme, key generation is performed using the same method as used in the NTRUSign signature scheme. As described above, the polynomials f and g are generated at random using the parameters df and dg. A polynomial h is generated by the expression h=Fq×g(mod q) using the polynomial Fq which satisfies Fq×f=1(mod q), as described in Non-Patent Reference 4. Moreover, the polynomials F and G with small norms, which satisfy the following expression is derived.

$$f \times G - g \times F = q$$

Here, it is assumed that {(f,g), (F,G)} denotes a private key and h denotes a public key. The private key is a key for generating a signature and is also called a signature generation key. The public key is a key for verifying a signature and is also called a signature verification key.

Here, x=y(mod q) is an operation which obtains, as the coefficient of i-th degree in the polynomial x, a remainder obtained when the coefficient of i-th degree in the polynomial y is divided by q so that the remainder indicates a value ranging from 0 to (q−1) (0≦i≦N−1). That is to say that it is an operation which obtains, as the polynomial x, a polynomial to which the (mod q) operation is performed so that each of the coefficients in the polynomial y indicates a value ranging from 0 to (q−1).

(4) Signature Generation in the Improved NTRUSign Signature Scheme

In the signature generation according to the improved NTRUSign signature scheme, a signature s of a message m for which a signature should be generated is calculated.

First, a 2·N-degree vector (m1, m2) (m1 and m2 are polynomials of degree N), which is a hash value for the message m, is calculated.

The polynomials a, b, A and B which satisfy the (Expression 1) and (Expression 2) below is calculated using the 2·N-degree vector (m1, m2) and a private key {(f,g), (F, G)}.

$$G \times m1 - F \times m2 = A + q \times B \quad \text{(Expression 1)}$$

$$-g \times m1 + f \times m2 = a + q \times b \quad \text{(Expression 2)}$$

Here, it is presumed that each or the coefficients in the polynomials A and a is a remainder obtained when divided by q so that the remainder indicates a value ranging from "<−q/2>+1" to "<q/2>". In other words, in the case where the remainder indicates a value ranging from "<q/2>" to "q−1", the remainder is adjusted through the subtraction of q so as to fall within the above-mentioned range. Here, <x> indicates the largest value within the values indicating x or lower. For example, <−½>=−1.

The polynomials s and t are calculated by the following (Expression 3) and (Expression 4).

$$s = f \times B + F \times b \pmod{q} \quad \text{(Expression 3)}$$

$$t = g \times B + G \times b \pmod{q} \quad \text{(Expression 4)}$$

In the embodiment of the present invention, when $s = s\_0 + s\_1 \cdot X + s\_2 \cdot X^2 + \ldots + s\_(N-1) \cdot X^{(N-1)}$ is given, a signature s' is obtained using the polynomial s and a polynomial v0 which corresponds to the norm 0 vector (1, 1, ..., 1) as shown in the following expression (Expression 5).

$$\begin{aligned} s' &= s - s\_0 \times v0 \quad \text{(Expression 5)} \\ &= 0 + (s\_1 - s\_0) \cdot X + (s\_2 - s\_0) \cdot X \wedge 2 + \ldots + \\ &\quad (s\_(N-1) - s\_0) \cdot X \wedge (N-1) \end{aligned}$$

Specifically, in the present embodiment, a polynomial s' is defined as a signature which is obtained by subtracting the norm 0 vector from the polynomial s so that the first element (a coefficient of a constant term) of the polynomial s indicates "0".

In other words, in the present embodiment, the polynomial s' is generated as a result of converting the format of the polynomial s so that the first element out of N elements included in the polynomial s indicates "0" without changing the norm of the polynomial s.

(5) Signature Verification by the Improved NTRUSign Signature Scheme

In the signature verification by the improved NTRUSign signature scheme, whether or not the signature s' is the authorized signature for the message m to be signed is verified.

Specifically, it is checked at first whether or not the first element (the coefficient of 0-degree term) of the signature s' is "0". When the first element is not "0", the signature s' is determined as unauthorized signature and is denied. In other words, this checking can prevent the occurrence of norm zero vector forgery attack.

On the other hand, when the first element is "0", 2·N-degree vector (m1, m2) which is a hash value for the message m is obtained. Next, the polynomial t' is calculated based on the following (Expression 6) using the public key h.

$$t' = s' \times h \pmod{q} \quad \text{(Expression 6)}$$

The distance between 2·N-degree vectors (s', t') and (m1, m2). Then, the distance is checked whether or not it is smaller than Normbound. When it is smaller than Normbound, the signature s' is determined to be the authorized signature and is accepted. When it is greater than or equal to Normbound, the signature s' is determined to be the unauthorized signature and is denied. Note that, whether or not the first element of the signature s' is 0 may be checked after whether or not the distance of 2·N-degree vector is smaller than Normbound is checked.

Figure 3:
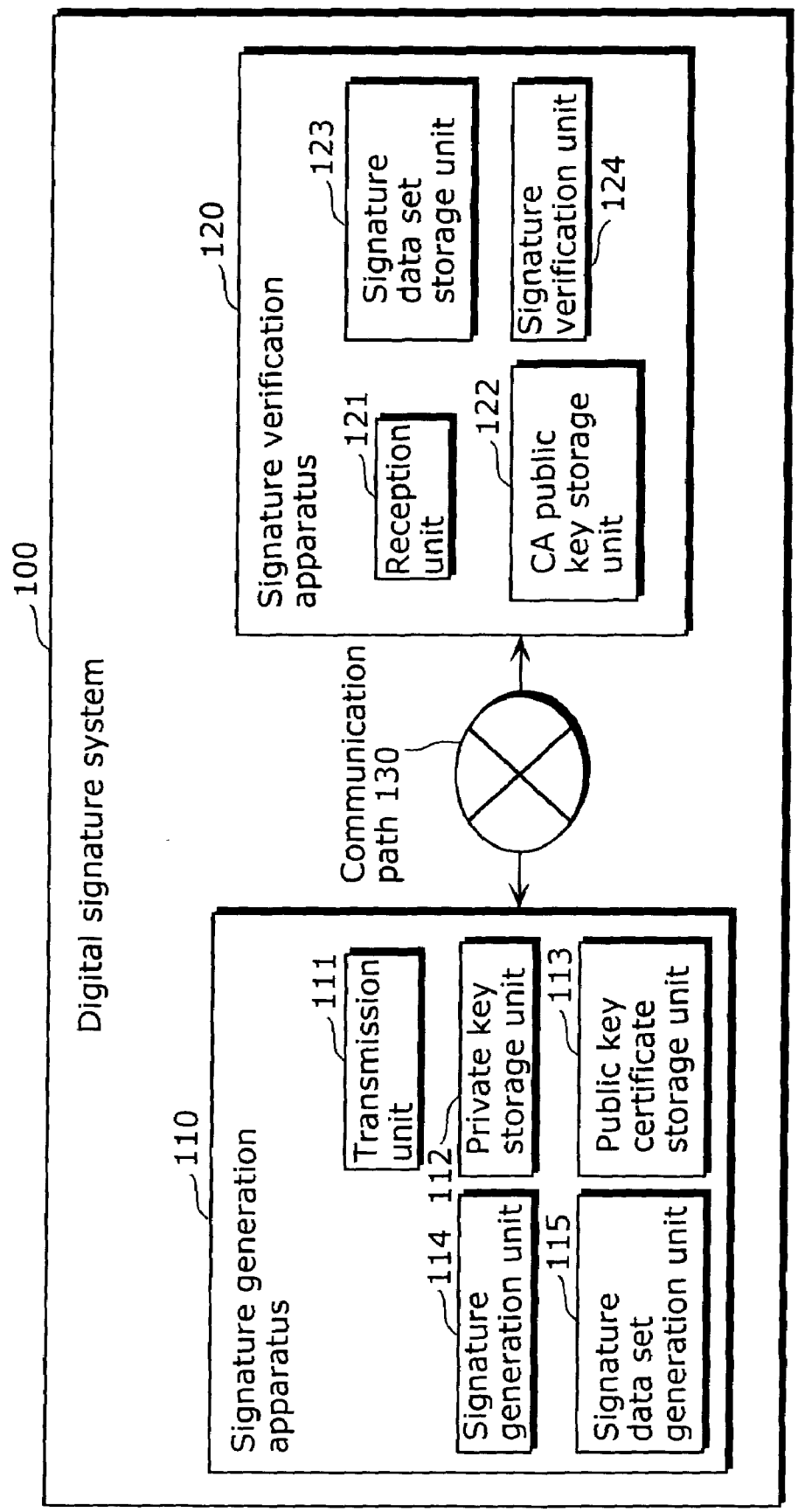
FIG. 3 is a block diagram showing a configuration of a digital signature system according to an embodiment of the present invention.

FIG. 3 is a block diagram showing a configuration of a digital signature system 100 according to the embodiment of the present invention.

The digital signature system 100 generates a signature using the above-mentioned improved NTRUSign signature scheme and verifies the generated signature. The digital signature system 100 includes a signature generation apparatus 110, a signature verification apparatus 120, and a communication path 130.

The signature generation apparatus 110 generates, based on the improved NTRUSign signature scheme, a signature data set SS which includes signature s' and the like for an inputted message m, and transmits the signature data set SS to the signature verification apparatus 120 via the communication path 130. This signature generation apparatus 110 also includes a transmission unit 111, a private key storage unit 112, a public key certificate storage unit 113, a signature generation unit 114 and a signature data set generation unit 115.

The signature verification apparatus 120 receives the signature data set SS from the signature generation apparatus 110 via the communication path 130, and verifies the signature s' and the like included in the signature data set SS, based on the improved NTRUSign signature scheme. This signature verification apparatus 120 also includes a reception unit 121, a CA public key storage unit 122, a signature data set storage unit 123, and a signature verification unit 124.

The following describes in detail the signature generation apparatus 110 according to the present embodiment.

The transmission unit 111 of the signature generation apparatus 110 transmits the signature data set SS to the signature verification apparatus 120 via the communication path 130.

The private key storage unit 112 stores a private key KS for generating the signature s' for the message m. Here, the private key KS shall be previously provided.

The public key certificate storage unit 113 stores a public key certificate CP of the public key KP (public key h) indicated by the polynomial h as indicated above. The public key certificate CP is made up of a public key KP, and signature data SP which indicates a signature of the public key KP authorized by Certificate Authority CA. The signature data SP is also generated using the improved NTRUSign signature scheme. The public key certificate CP shall be previously provided. Note that the public key certificate CP may include data other than the public key KP and the signature data SP. For example, the public key certificate CP may include a user identifier and a validity of the public key certificate CP.

The signature generation unit 114 generates signature data S indicating a signature s' for the message m, using the private key KS stored in the private key storage unit 112.

Figure 4:
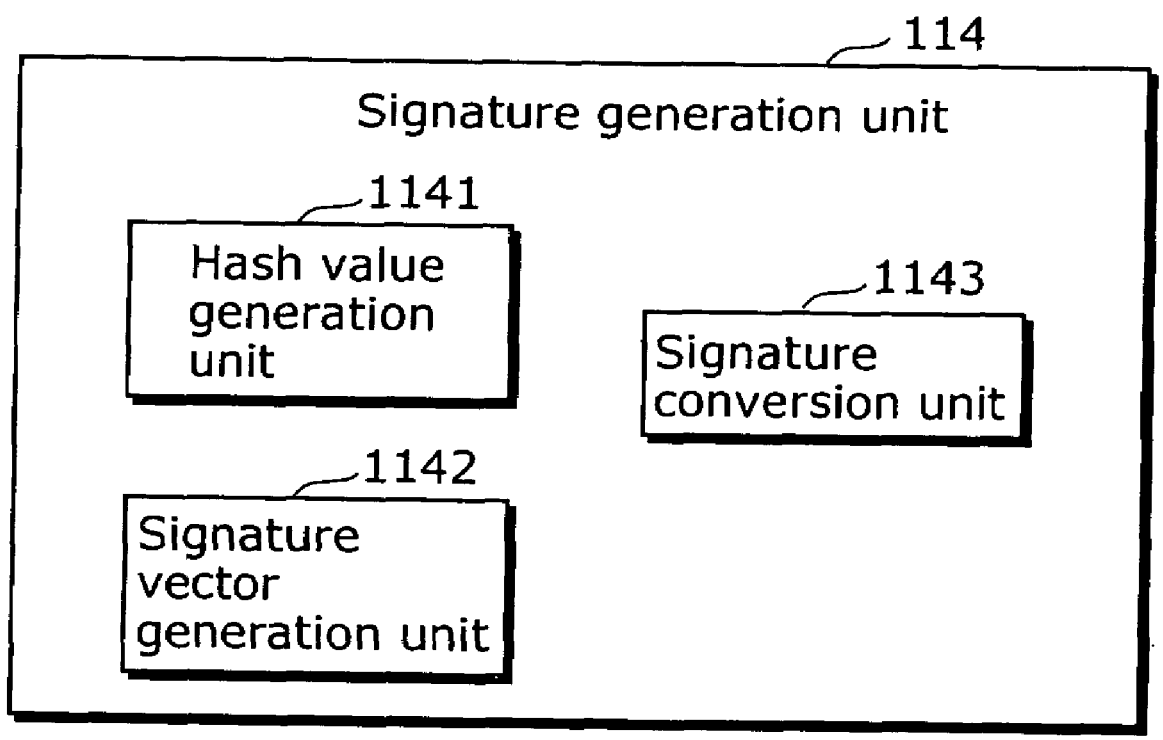
FIG. 4 is a block diagram showing a configuration of a signature generation unit according to the embodiment of the present invention.

FIG. 4 is a block diagram showing a configuration of the signature generation unit 114 according to the present embodiment.

The signature generation unit 114 includes a hash value generation unit 1141, a signature vector generation unit 1142, and a signature conversion unit 1143.

The hash value generation unit 1141 calculates a 2·N-degree vector (m1, m2) (m1 and m2 are polynomials of N-degree) which indicates a hash value H for the message m.

The signature vector generation unit 1142 generates the polynomial s based on the above-mentioned (Expression 1) through (Expression 4), using the private key KS and the hash value H.

The signature conversion unit 1143 generates the polynomial s' by the above-mentioned (Expression 5) using the polynomial s generated by the signature vector generation unit 1142. In other words, when the polynomial s is represented as $s=s\_0+s\_1 \cdot X+s\_2 \cdot X^2+ \ldots +s\_(N-1) \cdot X^{(N-1)}$, the signature conversion unit 1143 calculates the following expression, $s'=0+(s\_1-s\_0) X+(s\_2-s\_0) \cdot X^2+ \ldots +(s\_(N-1)-s\_0) \cdot X^{(N-1)}$ using $v0=(1, 1, \ldots, 1)$ which is a norm zero vector.

That is to say that the signature conversion unit 1143 according to the present embodiment generates, as a signature, specifically as signature data S, a polynomial s' which is a subtraction result obtained by subtracting norm zero vector from the polynomial s so that the first element of the polynomial s (a coefficient of a constant term) indicates "0".

In other words, the signature conversion unit 1143 generates the polynomial s' as a signature as a result of converting the format of the polynomial s so that the first element out of N elements included in the polynomial s indicates "0" without changing the norm of the polynomial s.

The signature data set generation unit 115 generates signature data set SS which is made up of a message m, signature data S of the message m and the public key certificate CP.

Figure 5:
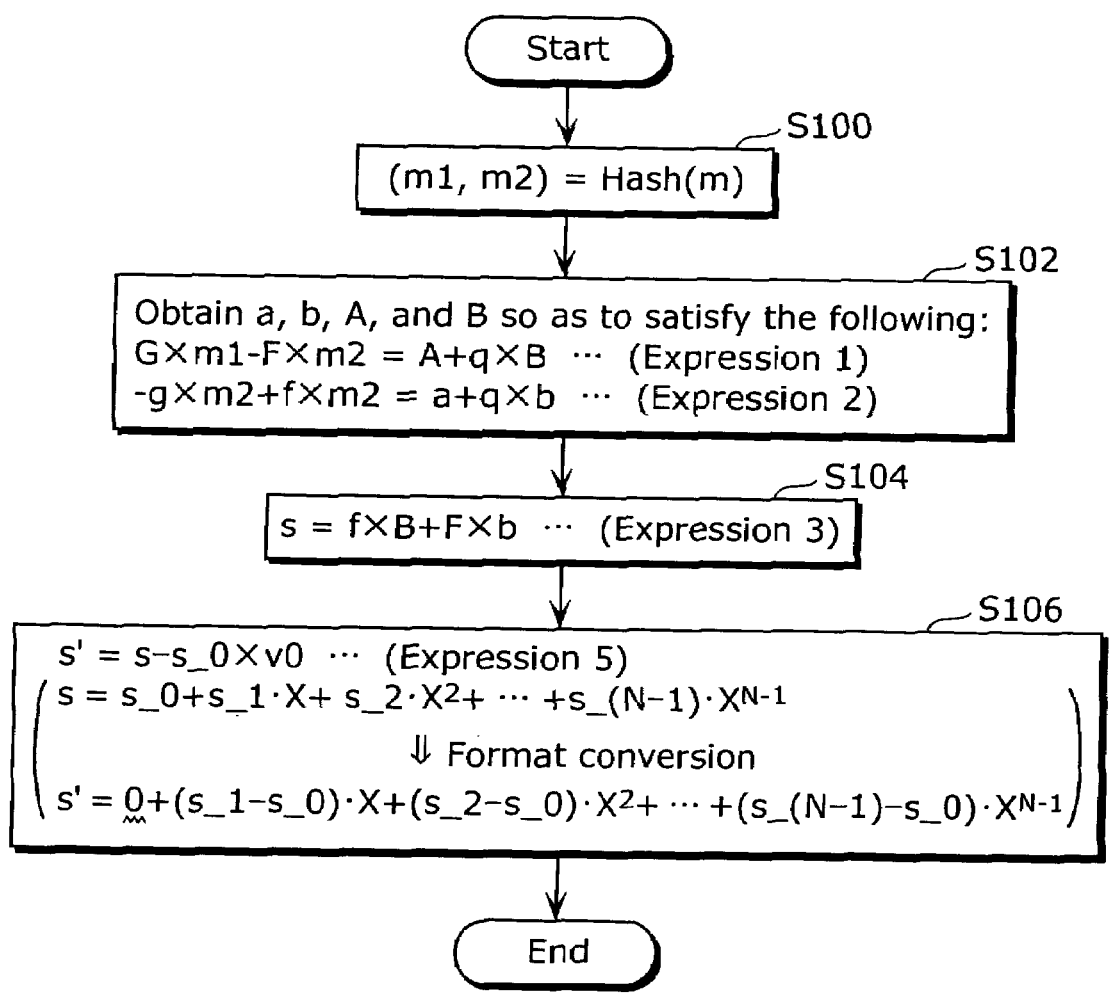
FIG. 5 is a flowchart showing an operation of the signature generation unit according to the embodiment of the present invention.

FIG. 5 is a flowchart showing an operation of the signature generation unit 114.

First, the hash value generation unit 1141 of the signature generation unit 114 calculates the 2·N-degree vector (m1, m2) which indicates a hash value H for the message m (Step S100).

Next, the signature vector generation unit 1142 of the signature generation unit 114 calculates the polynomials a, b, A and B which satisfy the (Expression 1) and (Expression 2) indicated above (Step S102). In addition, the signature vector generation unit 1142 calculates the polynomial s using the (Expression 3) indicated above (Step S104).

Figure 6:
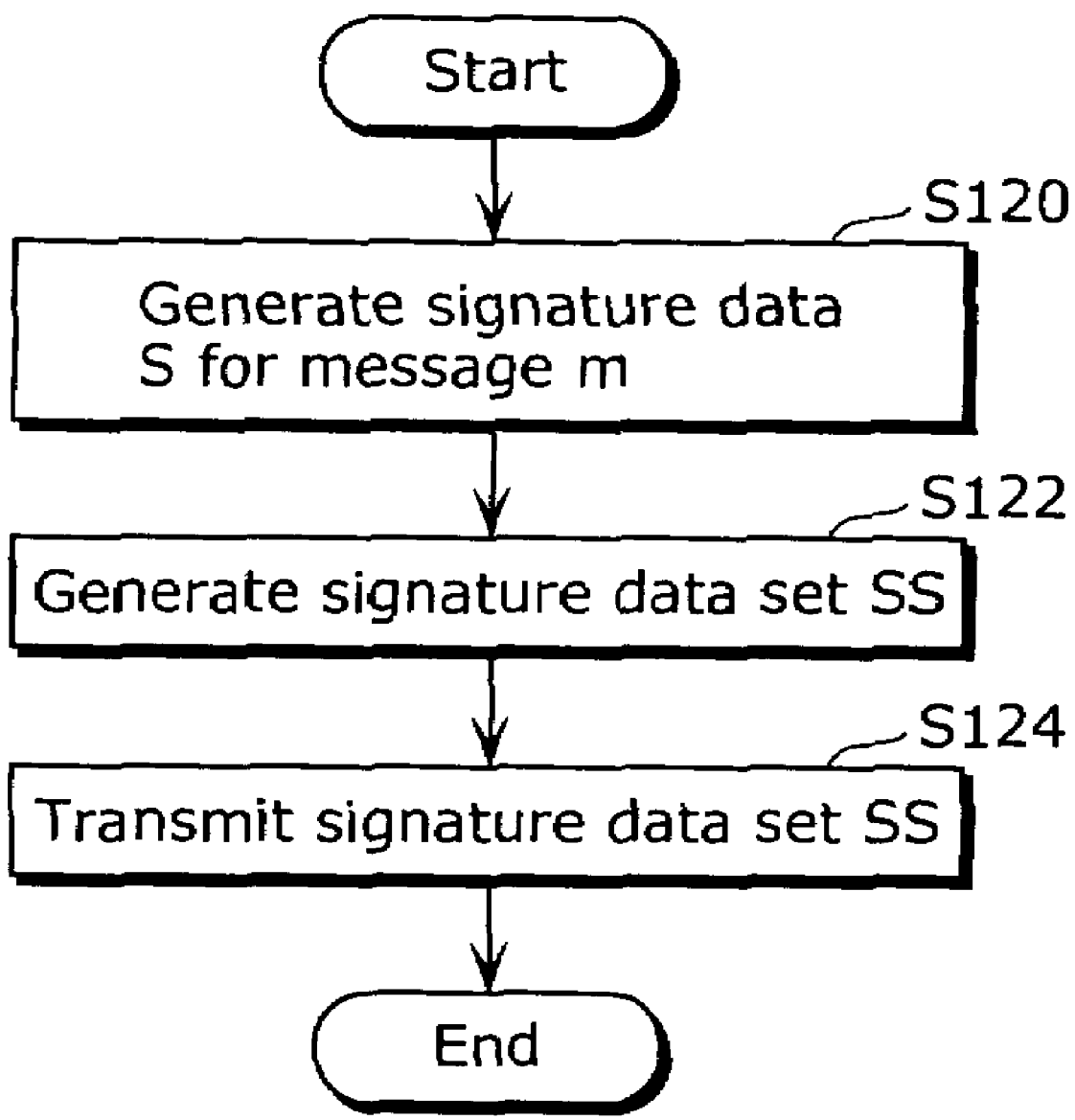
FIG. 6 is a flowchart showing an overall operation of a signature generation apparatus according to the embodiment of the present invention.

The signature conversion unit 1143 of the signature generation unit 114 then generates, as a signature, specifically as signature data S, a polynomial s' having the first element (a coefficient of a constant term) which indicates "0", by subtracting the norm zero vector from the polynomial s using the above-mentioned expression (Expression 5), FIG. 6 is a flowchart showing an overall operation of the signature generation apparatus 110.

The signature generation unit 114 of the signature generation apparatus 110 generates signature data S for a message m using the private key KS stored in the private key storage unit 112 (Step S120).

Next, the signature data set generation unit 115 of the signature generation apparatus 110 generates signature data set SS which is made up of the message m, the signature data S and the public key certificate CP stored in the public key certificate storage unit 113 (Step S122).

The transmission unit 111 of the signature generation apparatus 110 then transmits the signature data set SS to the signature verification apparatus 120 via the communication path 130 (Step S124).

The following describes in detail the signature verification apparatus 120 according to the present embodiment.

The reception unit 121 of the signature verification apparatus 120 receives the signature data set SS transmitted from the signature generation apparatus 110 via the communication path 130.

The CA public key storage unit 122 stores the CA public key KCP for verifying the public key certificate CP included in the signature data set SS.

The signature data set storage unit 123 stores the signature data set SS received by the reception unit 121.

The signature verification unit 124 verifies the signature data S included in the signature data set SS as well as the signature data SP included in the public key certificate CP.

Figure 7:
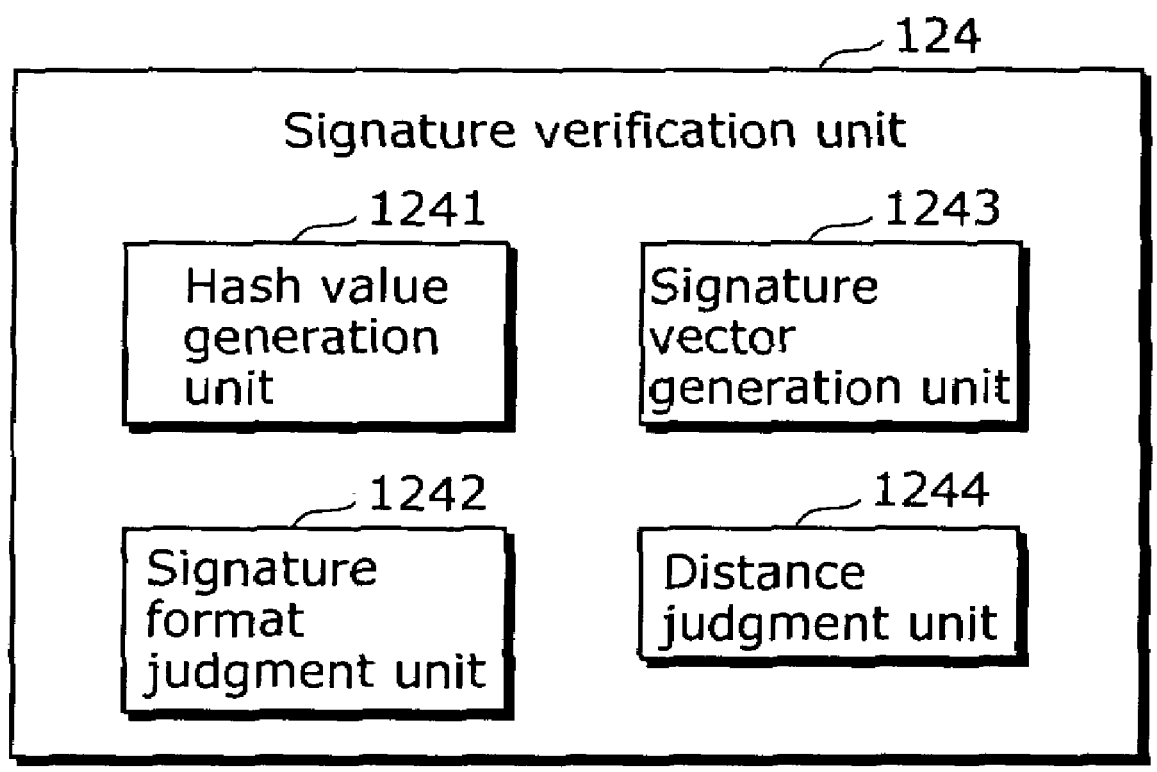
FIG. 7 is a block diagram showing a configuration of a signature verification unit according to the embodiment of the present invention.

FIG. 7 is a block diagram showing a configuration of the signature verification unit 124 according to the present embodiment.

The signature verification unit 124 includes a hash value generation unit 1241, a signature format judgment unit 1242, a signature vector generation unit 1243 and a distance judgment unit 1244.

The hash value generation unit 1241 calculates the respective hash values H(=(m1, m2)) of the public key KP and the message m which is data for which a signature is to be generated.

The signature format judgment unit 1242 judges whether or not first elements of respective signature data S and signature data SP that are to be verified by the modified NTRUSign signature scheme indicate "0". Here, the signature format judgment unit 1242 determines that normal 0 vector forgery attack is occurred against the signature data set SS received by the reception unit 121, when judging that at least one of the first elements of the signature data S and the signature data SP is "0". Specifically, the signature format judgment unit 1242 judges that a forgery is found in the signature data set SS. Accordingly, the occurrence of norm zero vector forgery attack can be prevented by executing such judgments in the present embodiment.

The signature vector generation unit 1243 calculates the polynomial t' based on the (Expression 6) indicated above using the polynomials s' indicated respectively by the signature data S and the signature data SP and the polynomial h indicated by the public key KP or the public key KCP. In other words, the signature vector generation unit 1243 calculates respective polynomials t' for the signature data S and the signature data SP, using t'=s'×h (mod q).

Furthermore, the signature vector generation unit 1243 generates, as the signature vector SV, the 2·N-degree vector (s', t') for the respective signature data S and signature data SP.

The distance judgment unit 1244 calculates a distance between the hash value H and the signature vector SV for the message m and the signature data S as well as for the public key KP and the signature data SP, and judges whether or not the distance is smaller than Normbound. In other words, in the case where the distance between the hash value and the signature vector SV for the message m and the signature data S is smaller than Normbound, the distance judgment unit 1244 judges that the signature data S is authorized data and accepts the signature data S. On the other hand, in the case where the distance is equal to or greater than Normbound, the distance judgment unit 1244 judges that the signature data S is unauthorized and denies the signature data S. Also, in the case where the distance between the hash value and the signature vector SV with respect to the public key KP and the signature data SP is smaller than Normbound, the distance judgment unit 1244 judges that the signature data SP is authorized and accepts the signature data SP. On the other hand, in the case where the distance is equal to or greater than Normbound, the distance judgment unit 1244 judges that the signature data SP is unauthorized and denies the signature data SP.

Figure 8:
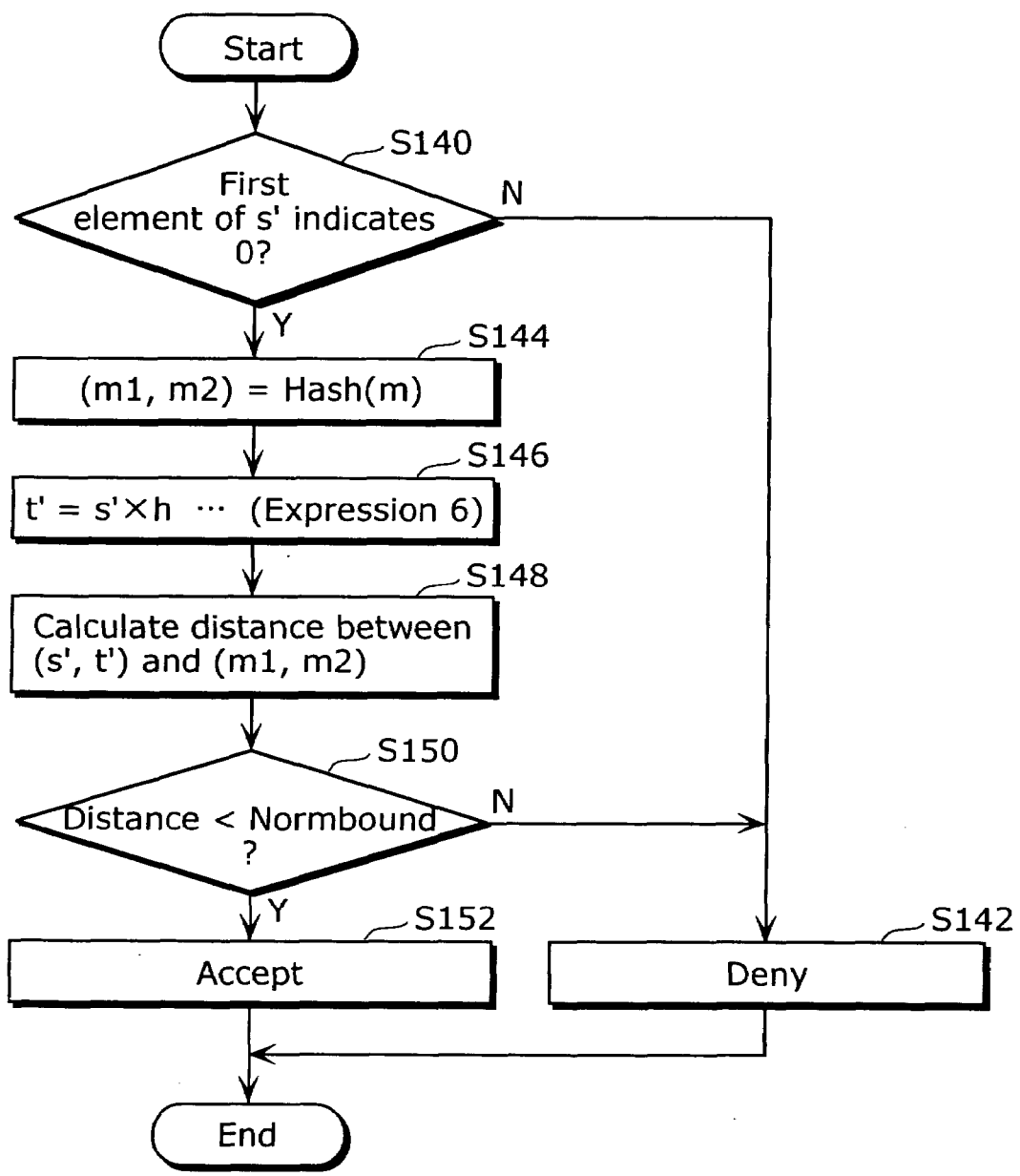
FIG. 8 is a flowchart showing an operation of the signature verification unit according to the embodiment of the present invention.

FIG. 8 is a flowchart showing an operation of the signature verification unit 124.

The signature verification unit 124 verifies the signature data S by carrying out the operation shown in FIG. 8 for the message m and the signature data S, using the public key KP. Note that the signature verification unit 124 verifies the signature data SP by performing the operation shown in FIG. 8 for the public key KP and the signature data SP, using the public key KCP before the verification of the signature data S.

The following describes a detailed operation performed by the signature verification unit 124 to verify the signature data S with reference to FIG. 8.

First, the signature format judgment unit 1242 of the signature verification unit 124 judges whether or not the first element (a coefficient of a constant term) of the polynomial s' indicated by the signature data S indicates "0" (S140). Here, when judging that it is not "0" (N in Step S140), the signature format judgment unit 1242 determines that the signature data S is incorrect and denies the signature data S (Step S142). On the other hand, when the signature format judgment unit 1242 judges that it is "0" (Y in Step S140), the hash value generation unit 1241 calculates the hash value H(=(m1, m2)) for the message m which corresponds to the signature data S (Step S144).

Next, the signature vector generation unit 1243 calculates the polynomial t' based on the (Expression 6) indicated above, using the polynomial s' indicated by the signature data S and the polynomial h indicated by the public key KP (Step S146). Here, the signature vector generation unit 1243 generates 2·N-degree vector (s', t') as the signature vector SV with respect to the signature data S.

The distance judgment unit 1244 calculates a distance between the hash value H(m1, m2) calculated in Step S144 and the signature vector SV generated in Step S146 (Step S148). Then, the distance judgment unit 1244 judges whether or not the distance is smaller than Normbound (Step S150). In the case of judging that the distance is smaller than Normbound (Y in Step S150), the distance judgment unit 1244 judges that the signature data S is authorized and accepts the signature data S (Step S152). On the other hand, in the case of judging that the distance is not smaller than Normbound (N in Step S150), the distance judgment unit 1244 judges that the signature data S is unauthorized and denies the signature data S (Step S142).

Figure 9:
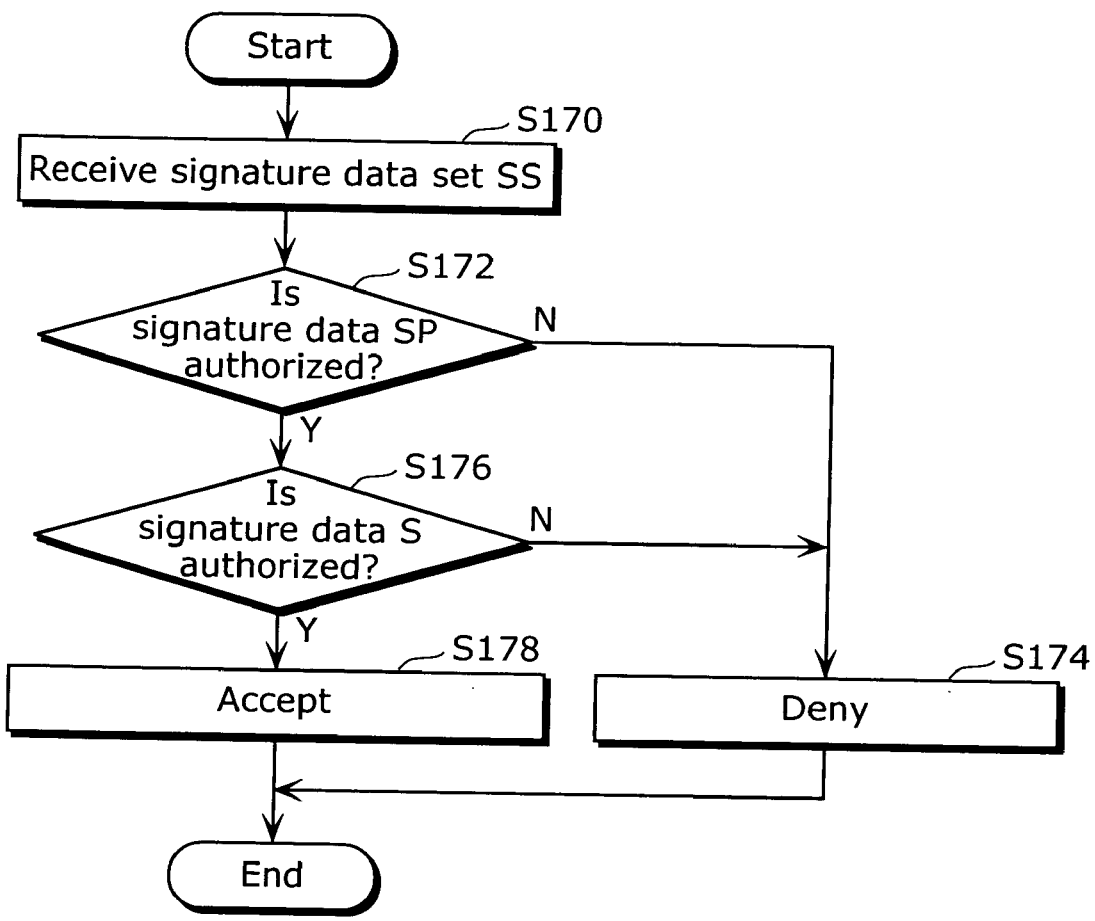
FIG. 9 is a flowchart showing an overall operation of a signature verification apparatus according to the embodiment of the present invention.

FIG. 9 is a flowchart showing an overall operation of the signature verification apparatus 120.

First, the reception unit 121 of the signature verification apparatus 120 receives the signature data set SS from the signature generation apparatus 110 via the communication path 130, and stores the signature data set SS into the signature data set storage unit 123 (Step S170).

The signature verification unit 124 verifies, for the public key KP and the signature data SP included in the public key certificate CP within the signature data set SS, whether or not the signature data SP is an authorized signature of the public key KP, using the CA public key KCP stored in the CA public key storage unit 122. In other words, the signature verification unit 124 judges whether or not the signature data SP is an authorized signature (Step S172). Here, in the case of judging that the signature data SP is not an authorized signature, the signature verification unit 124 denies the signature data SP (Step S174).

On the other hand, in the case of judging that the signature data SP is an authorized signature (Y in Step S172), the signature verification unit 124 accepts the signature data SP, and verifies whether or not the signature data S is an authorized signature for the message m with respect to the message m and the signature data S within the signature data set SS, using the public key KP. In other words, the signature verification unit 124 judges whether or not the signature data S is an authorized signature (Step S176).

Here, in the case of judging that the signature data S is not authorized (N in Step S176), the signature verification unit 124 denies the signature data S (Step S174). On the other hand, in the case of judging that the signature data S is authorized (Y in Step S176), the signature verification unit 124 accepts the signature data S (Step S178). That is to say, in Step S178, the signature verification unit 124 recognizes that the signature data set SS is data provided with an authorized signature.

Accordingly, in the digital signature system 100 which performs processing using the improved NTRU Sign signature scheme according to the present embodiment, a format of the polynomial s is converted without changing a norm of the polynomial s as indicated in the (Expression 5), and the conversion result of the polynomial s' whose format has the first element which indicates "1" is used as a signature. In this digital signature system 100, in the case where signature data indicating a polynomial is verified, whether or not the first element of the polynomial indicates "0" is judged. Therefore, the occurrence of norm zero vector forgery attack against the signature data can be prevented.

In other words, in the present embodiment, the signature verification apparatus 120 judges whether or not the polynomial which is used as a signature has a format as indicated above, and when judging that it does not have such format, determines that the polynomial is an unauthorized signature.

For example, the signature generation apparatus 110 generates, as a signature, the polynomial $s'=0+s\_1 \cdot X+s\_2 \cdot X^2+\ldots+s\_(N-1) \cdot X^{(N-1)}$ having the first element which indicates "0". When a norm zero vector $v0$ $(1, 1, \ldots, 1)$ is added to the polynomial s', the resulting polynomial sa is indicated as follows:

$$sa=s'+v0=1+(s\_+1) \cdot X+(s\_2+1) \cdot X^2+\ldots+(s\_(N-1)+1) \cdot X^{\wedge}a(N-1)$$

In other words, the first element of the polynomial sa is not "0" so that the format of the polynomial sa is not the format as indicated above. Therefore, since the format of the polynomial sa is not such a format indicated above, the signature verification apparatus 120 determines the polynomial sa as an unauthorized signature.

With the conventional technology, when a norm zero vector is added to a polynomial which is used as a signature, the norm of said polynomial is the same as a norm of the polynomial to which the norm zero vector is added, and therefore resulting in that the polynomial to which the norm zero vector is added is also determined as an authorized signature. In other words, norm zero vector forgery attack is occurred with the conventional technology. On the other hand, in the present embodiment, as described above, the format of a polynomial which is used as a signature is converted into a predetermined format at the time of signature generation, and whether or not the format of the polynomial to be verified is the predetermined format is judged at the time of signature verification. Consequently, whether or not the polynomial to be verified is an unauthorized signature to which the norm zero vector is added can be easily judged in the case where a norm of the polynomial generated at the time of signature generation is the same as a norm of the polynomial to be verified.

In other words, in the present embodiment, plural polynomials s having the same distance between the conventional 2·N-degree vector (s, t) and (m1, m2) are expressed as one polynomial having a predetermined format and the polynomial having such format is used as a signature. For example, in the case where each of the following s', s'+(1, 1, . . . , 1), s'+(2, 2, . . . , 2), s'+(3, 3, . . . , 3), and . . . is a polynomial s, the same distance between the 2·N-degree vectors (s, t) and (m1, m2) is calculated with respect to each polynomial s. Accordingly, in the present embodiment, all of the following s', s'+(1, 1, . . . , 1), s'+(2, 2, . . . , 2), s'+(3, 3, . . . , 3), and . . . are expressed as a polynomial s' having a format for example in which the first element indicates "0", and the polynomial s' is used as a signature. Therefore, the distance with respect to a polynomial to which the norm zero vector is added such as s'+(2, 2, . . . , 2), s'+(3, 3, . . . , 3) or the like, equals to the distance with respect to the polynomial s'. However, such polynomial format is different from the format of the polynomial s' so that such polynomial is judged as an unauthorized signature.

Accordingly, in the signal signature system 100 according to the present embodiment does not cause norm zero vector forgery attack so that security is provided.

(First Variation)

Here, a first variation of the aforementioned embodiment shall be described.

Although the aforementioned embodiment describes, as a signature, the polynomial s' having "0" as the first element, the present variation describes, as a signature, the polynomial s' having "0" as the last element (a coefficient of (N−1) degree term). In other words, although the format of a polynomial used as a signature in the aforementioned embodiment is a format having "0" as the first element, the format of a polynomial used as a signature in the present variation is a format having "0" as the last element.

Specifically, the signature conversion unit 1143 of the signature generation unit 114 according to the present variation calculates the polynomial s' using the following (Expression 7) instead of calculating the polynomial s' using the polynomial s and the aforementioned (Expression 5).

$$s'=s (\bmod L) \qquad \text{(Expression 7)}$$

where $L=X^{\wedge}(N-1)+X^{\wedge}(N-2)+\ldots+X+1$

Figure 10:
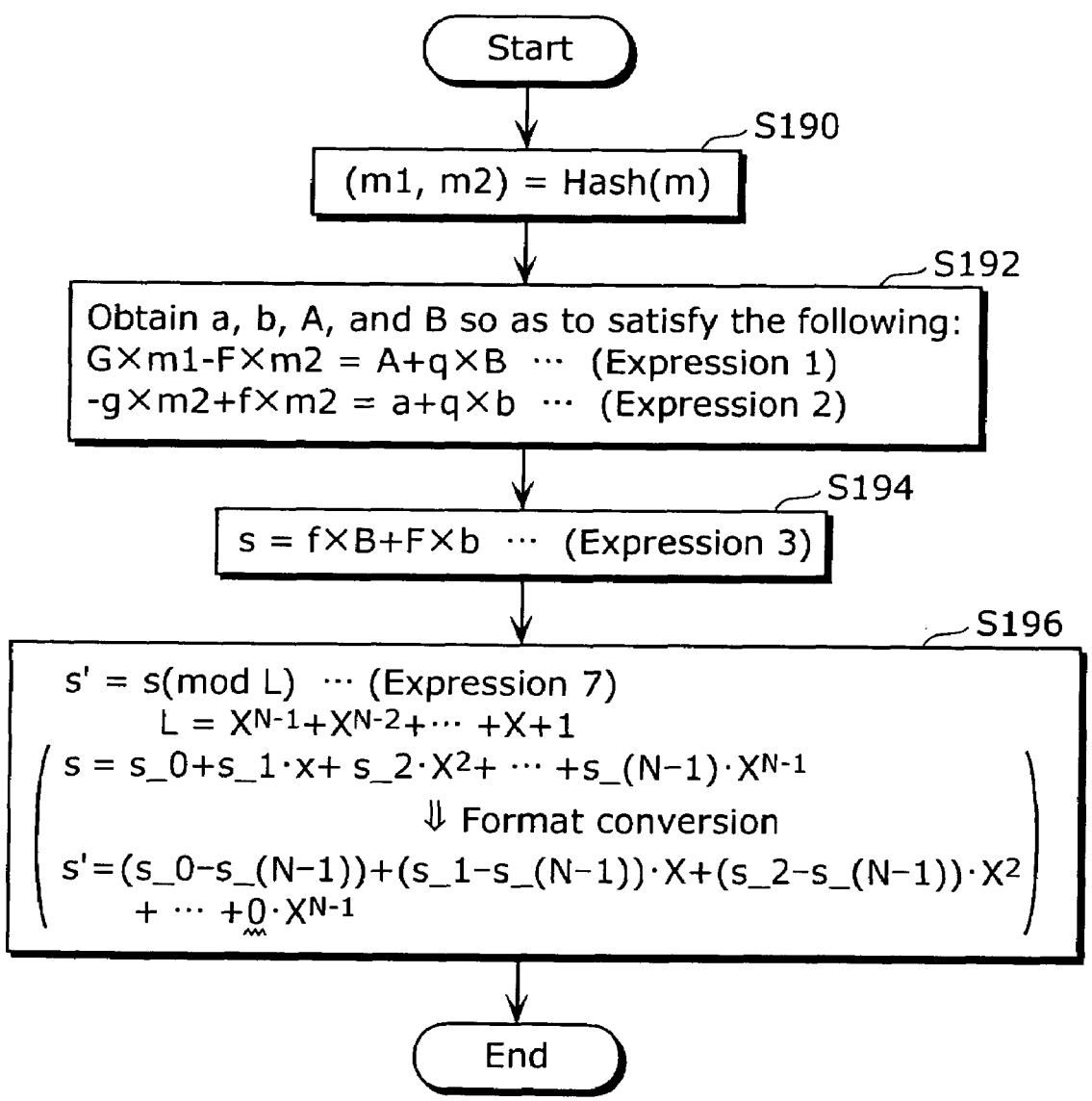
FIG. 10 is a flowchart showing an operation of the signature generation unit according to a first variation of the embodiment of the present invention.

FIG. 10 is a flowchart showing an operation of the signature generation unit 114 according to the present variation.

First, the hash value generation unit 1141 of the signature generation unit 114 calculates a 2·N-degree vector (m1, m2) indicating a hash value H for the message m (Step S190).

Next, the signature vector generation unit 1142 of the signature generation unit 114 calculates polynomials a, b, A, and B which satisfy the (Expression 1) and (Expression 2) (Step S192). In addition, the signature vector generation unit 1142 calculates the polynomial s using the (Expression 3) (Step S194).

The signature conversion unit 1143 of the signature generation unit 114 calculates a remainder modulo $L(=X^{\wedge}(N-1)+X^{\wedge}(N-2)+\ldots+X+1)$ with respect to the polynomial s using the (Expression 7), and generates the polynomial s' having "0" as the last element (a coefficient of (N−1) degree term) as a signature, specifically as signature data S (Step S196).

Figure 11:
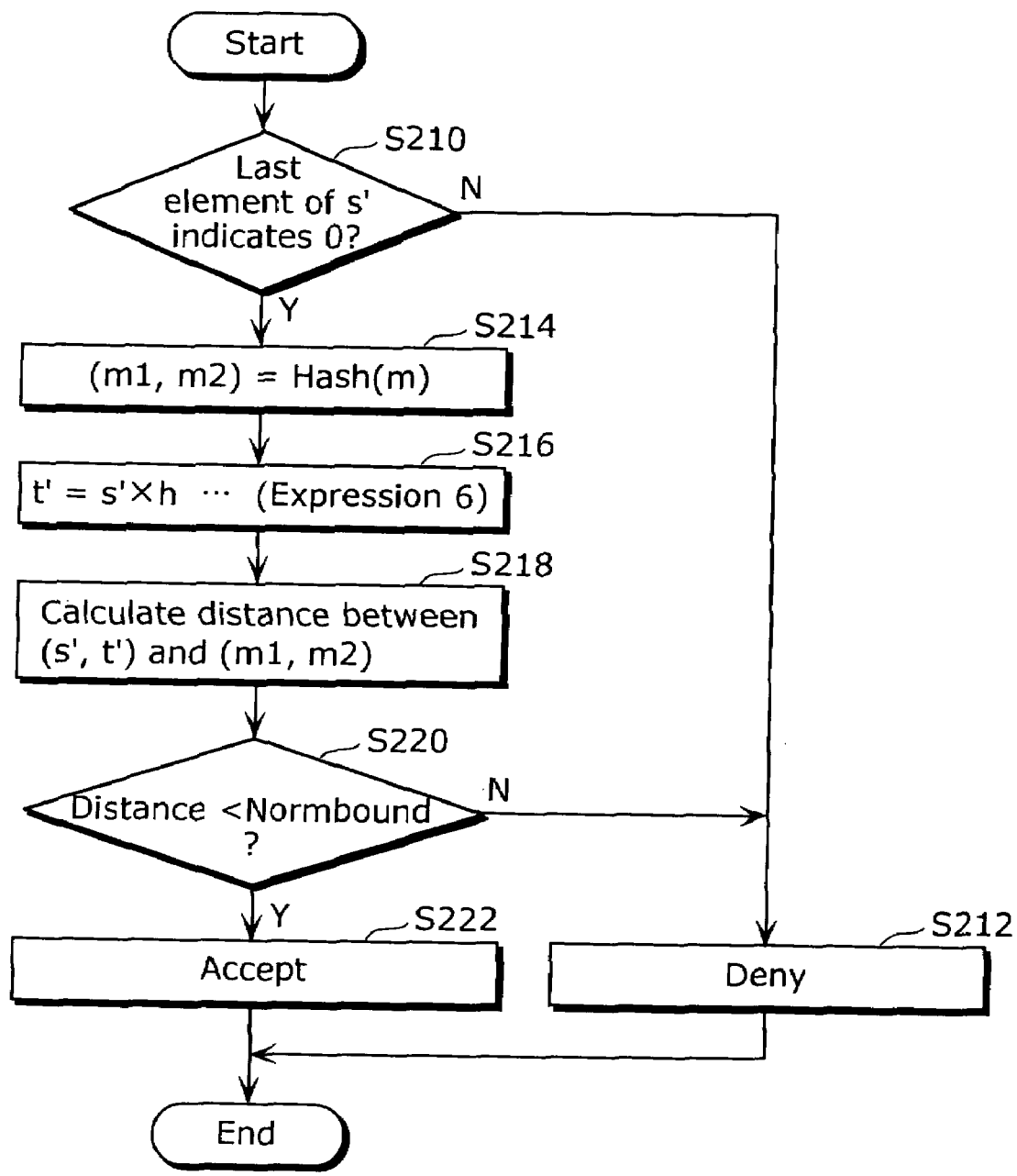
FIG. 11 is a flowchart showing an operation of the signature verification unit according to the first variation of the embodiment of the present invention.

FIG. 11 is a flowchart showing an operation of the signature verification unit 124 according to the present variation.

The signature verification unit 124 performs an operation shown in FIG. 11 on the message m and the signature data S using a public key KP, and verifies the signature data S. Note that, the signature verification unit 124 verifies signature data SP by performing the operations shown in FIG. 11 on the public key KP and the signature data SP using a public key KCP before verifying the signature data S.

The following describes a detailed operation by the signature verification unit 124 for verifying the signature data S with reference to FIG. 11.

First, the signature format judgment unit 1242 of the signature verification unit 124 judges whether or not the last element (a coefficient of (N—1) degree term) of the polynomial s' indicated by the signature data S is "0" (Step S210). Here, when judging that it is not 0 (N in Step S210), the signature format judgment unit 1242 determines that the signature data S is unauthorized data and denies the signature data S (Step S212). On the other hand, when the signature format judgment unit 1242 judges that it is "0" (Y in Step S210), the hash value generation unit 1241 calculates a hash value H(=(m1, m2)) for the message m which corresponds to the signature data S (Step S214).

Next, the signature vector generation unit 1243 calculates the polynomial t' based on the (Expression 6) using the polynomial s' indicated by the signature data S and the polynomial h indicated by the public key KP (Step S216). The signature vector generation unit 1243 generates 2·N-degree vector (s', t') as a signature vector SV with respect to the signature data S.

The distance judgment unit 1244 calculates a distance between the hash value H(=(m1, m2)) obtained in Step S214 and the signature vector SV generated in Step S216 (Step S218). The distance judgment unit 1244 then judges whether or not the calculated distance is smaller than Normbound (Step S220). When judging that it is smaller than Normbound (Y in Step S220), the distance judgment unit 1244 determines that the signature data S is authorized data and accepts the signature data S (Step S222). On the other hand, when judging that it is not smaller than Normbound (N in Step S220), the distance judgment unit 1244 determines that the signature data S is unauthorized data and denies the signature data S (Step S212).

Accordingly, in the present variation, as shown in the (Expression 7), the format of the polynomial s is converted without changing the norm of the polynomial s, and its conversion result of polynomial s' having "0" as the last element is used as a signature. Therefore, when verifying the signature data indicating a polynomial, the digital signature system 100 can prevent the occurrence of norm zero vector forgery attack against the signature data by judging whether or not the last element of a polynomial is "0".

(Second Variation)

Here, a second variation of the aforementioned embodiment shall be described.

As similar to the first variation 1, the format of the polynomial s is converted without changing the norm of the polynomial s so that the last element (a coefficient of (N−1) degree term) indicates "0", and the respective formats of the hash value for the message m and a product of the signature and the public key are also converted without changing respective norms so that the last element (the coefficient of (N−1) degree term) indicates "0".

Furthermore, in the digital signature system 100 according to the present variation, signature generation and signature verification are performed using a polynomial pair {f", g", F", G"} instead of a polynomial pair {f, g, F, G} as a private key and a polynomial h" instead of a polynomial h as a public key KP. Here, given L=X^(N−1)+X^(N−2)+ ... +X+1, f", g", F" and G" are indicated by the following expressions.

$$f''=f(\bmod L), g''=g(\bmod L), F''=F(\bmod L), G''=G(\bmod L), \text{ and } h''=h(\bmod L)$$

Specifically, four polynomials indicating the private key explained in the present variation are respectively modified into a format so that the last element (a coefficient of (N−1) degree term) indicates "0", and the polynomial indicating the public key of the present variation is modified into the format so that the last element (a coefficient of (N−1) degree term) indicates "0". Here, norms of respective polynomials f, g, F and G are equal to the norms of the respective polynomials f", g", F" and G", and the norm of the polynomial h is equal to the norm of the polynomial h".

Figure 12:
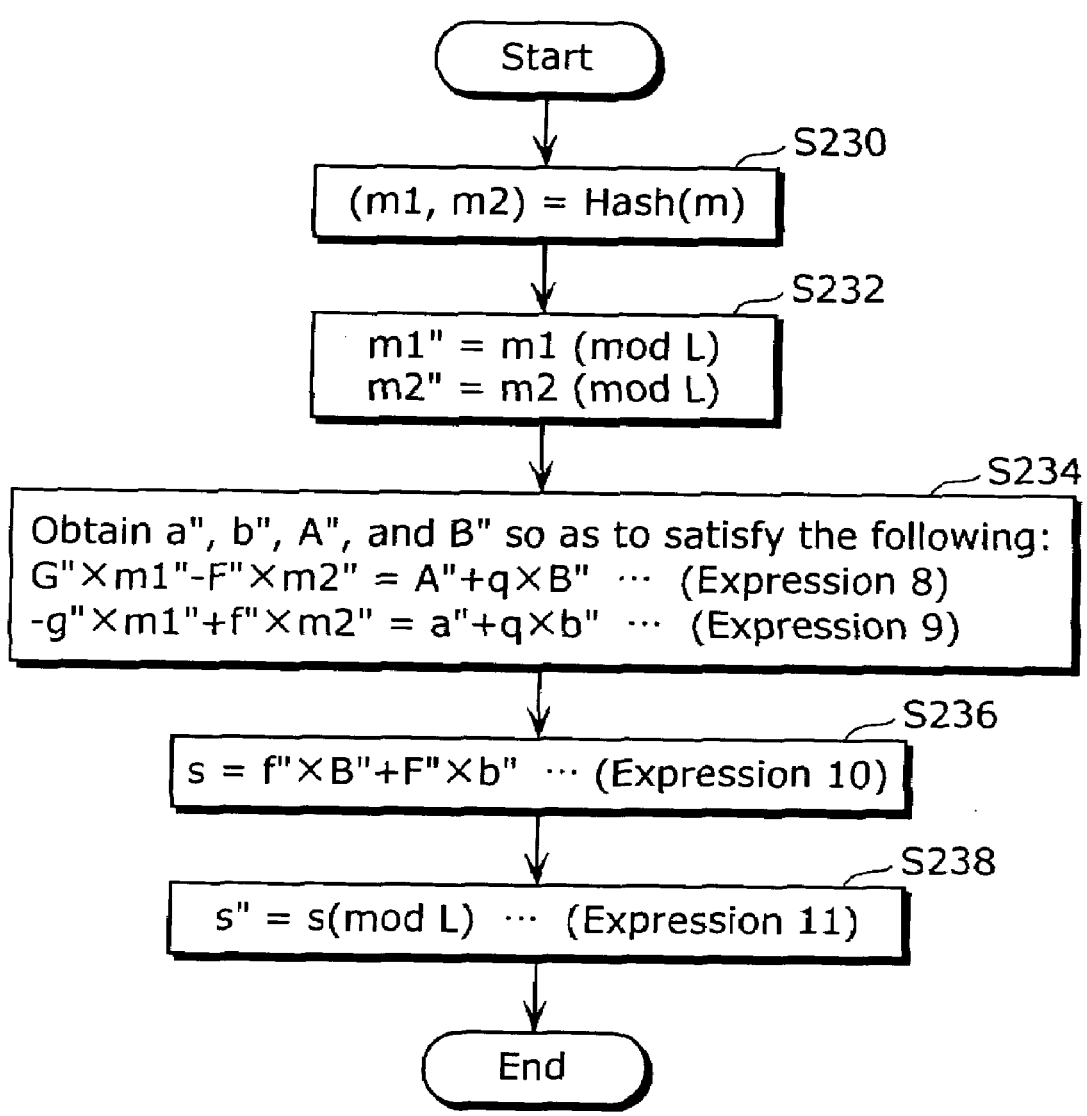
FIG. 12 is a flowchart showing an operation of the signature generation unit according to a second variation of the embodiment of the present invention.

FIG. 12 is a flowchart showing an operation of the signature generation unit 114 according to the present variation.

First, the hash value generation unit 1141 of the signature generation unit 114 calculates the 2·N-degree vector (m1, m2) indicating a hash value H for the message m (Step S230). Furthermore, the hash value generation unit 1141 calculates (m1", m2") using m1"=m1(mod L) and m2"=m2(mod L) (Step S232). Specifically, the hash value generation unit 1141 generates a vector (m1", m2") by converting the formats of respective polynomials of 2·N-degree vector (m1, m2) without changing the norms of the polynomials so that the last element (a coefficient of (N−1)-degree term) indicates "0".

Next, the signature vector generation unit 1142 of the signature generation unit 114 calculates a", b", A" and B" which satisfy the following (Expression 8) and (Expression q) (Step 234).

$$G''\times m1''-F''\times m2''=A''+q\times B'' \quad \text{(Expression 8)}$$

$$-g''\times m1''+f''\times m2''=a''+q\times b'' \quad \text{(Expression 9)}$$

Furthermore, the signature generation unit 1142 calculates the polynomial s using the following (Expression 10) (Step S236).

$$s=f''\times B''+F''\times b'' (\bmod q) \quad \text{(Expression 10)}$$

The signature conversion unit 1143 of the signature generation unit 114 then calculates a remainder modulo to L(=X^(N−1)+X^(N−2)+ ... +X+1) of the polynomial s using the following (Expression 11), and generates the polynomial s" having the last element (the coefficient of (N−1) degree term) as "0", as a signature, specifically, as the signature data S (Step S238).

$$s''=s(\bmod L) \quad \text{(Expression 11)}$$

Figure 13:
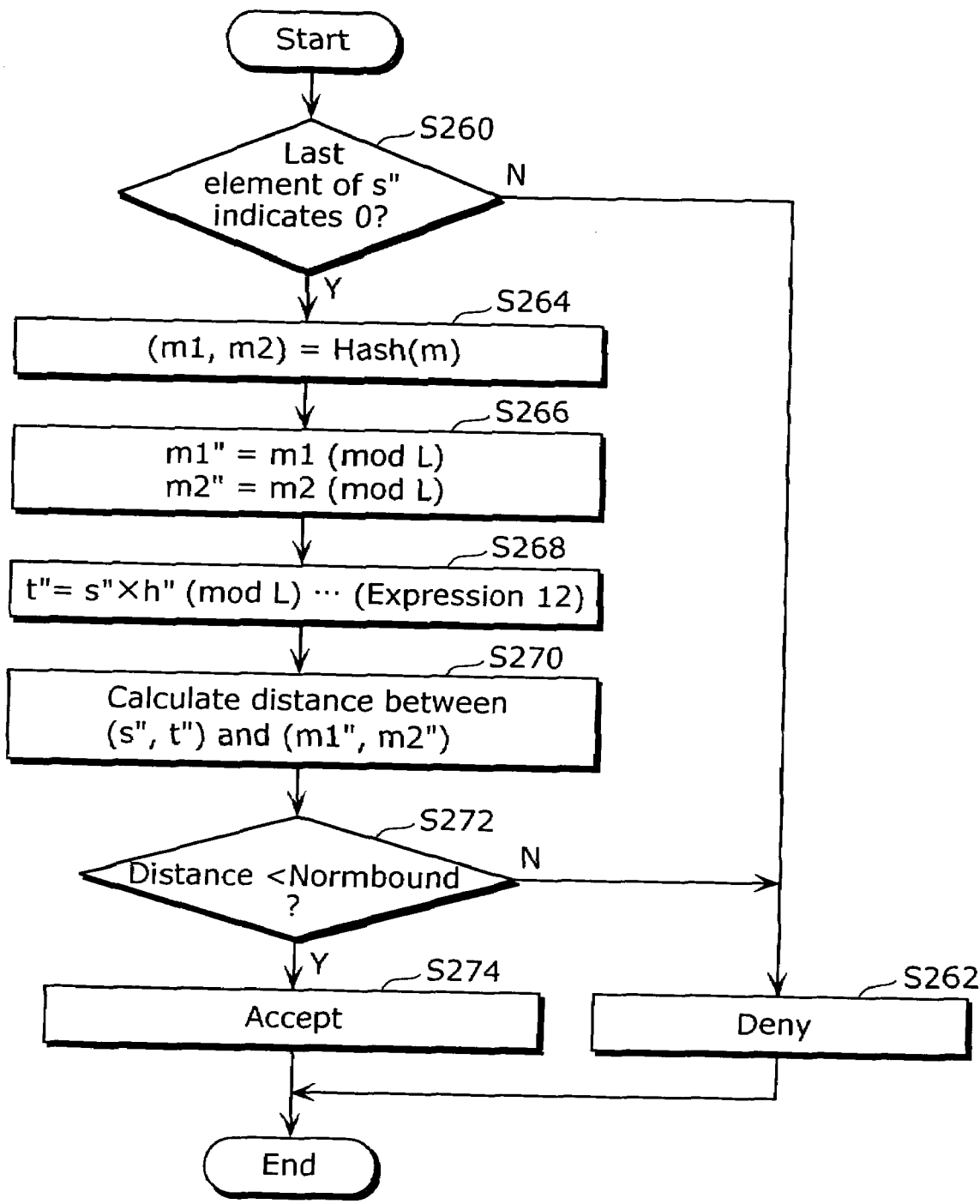
FIG. 13 is a flowchart showing an operation of the signature verification unit according to the second variation of the embodiment of the present invention.

FIG. 13 is a flowchart showing an operation of the signature verification unit 124 according to the present variation.

The signature verification unit 124 verifies the signature data S by performing the operation shown in FIG. 13 with respect to the message m and the signature data S, using the public key KP. It should be noted that the signature verification unit 124 verifies signature data SP by performing the operation shown in FIG. 13 on the public key KP and the signature data SP, using the public key KCP before verifying the signature data S.

The following describes a detailed operation by the signature verification unit 124 for verifying the signature data S with reference to FIG. 13.

First, the signature format judgment unit 1242 of the signature verification unit 124 judges whether or not the last element (a coefficient of (N−1) degree term) of the polynomial s" indicated by the signature data S is "0" (Step S260). Here, when judging that it is not "0" (N in Step S260), the signature format judgment unit 1242 determines that the signature data S is unauthorized data and denies the signature data S (Step S262). On the other hand, when the signature format judgment unit 1242 judges that it is 0 (Y in Step S260), the hash value generation unit 1241 calculates the hash value H(=(m1, m2)) for the message m which corresponds to the signature data S (Step S264). Furthermore, the hash value generation unit 1241 calculates (m1", m2") using m1"=m1 (mod L) and m2"=m2(mod L) (Step S266).

Next, the signature vector generation unit 1243 calculates a polynomial t" based on the following (Expression 12) using the polynomial s" indicated by the signature data S and the polynomial h" indicated by the public key KP (Step S268).

$$t''=s''\times h''(\bmod L) \quad \text{(Expression 12)}$$

Furthermore, the signature vector generation unit 1243 herein generates the 2·N-degree vector (s", t") as the signature vector SV with respect to the signature data S.

The distance judgment unit 1244 calculates a distance between the hash value H(=(m1", m2")) obtained in Step S266 and the signature vector SV generated in Step S216 (Step S270). The distance judgment unit 1244 then judges whether or not the distance is smaller than Normbound (Step S272). When judging that the distance is smaller than Normbound (Y in Step S272), the distance judgment unit 1244 determines that the signature data S is authorized data and accepts the signature data S (Step S274). On the other hand, when judging that the distance is not smaller than Normbound (N in Step S272), the distance judgment unit 1244 determines that the signature data S is unauthorized data and denies the signature data S (Step S262).

Accordingly, in the present variation, not only for the polynomial s" used as a signature, four polynomials f", g", F" and G" of a private key, a polynomial h" indicating a public key, a hash value (m1", m2") for the message m, and a product t" of the signature s" and the public key h" are also modified into the format so that the last element (the coefficient of (N−1) degree term) indicates. Accordingly, security level can be raised with respect to each of polynomials s", f", g", F", G", h", m1", m2", and t".

Furthermore, since the last element of each of the respective s", f", g", F", G", h", m1", m2" and t" is fixed to "0", only the terms ranging from "0" to "N−2" degree may be stored without storing the last element. This can reduce the size necessary for the storage.

Although the present invention shows an example of storing the private key made of a polynomial set {f", g", F", G"} in advance, the private key made of the polynomial set {f, g, F, G} may be previously stored in the private key storage unit 112. Similarly, although the present variation describes to store the public key KP indicated by the polynomial h" into the public key certificate storage unit 113 in advance, the public key KP indicated by the polynomial h may be previously stored in the public key certificate storage unit 113. In this case, the signature generation unit 114 converts the polynomial set {f, g, F, G} stored in the private key storage unit 112 into the polynomial set {f", g", F", G"}, and generates a signature s" using the polynomial set {f", g", F", G"}. Furthermore, the signature data set generation unit 115 converts the polynomial h indicating the public key KP stored in the public key certificate storage unit 113 into the polynomial h", and makes the public key KP indicated by the polynomial h" into the signature data set SS.

Although, the present invention has been described based on the above-mentioned embodiment and variations, the embodiment and variations of the present invention only show examples of the present invention, and therefore the present invention is not restricted to them. In other words, the present invention can be realized in various modifications within a scope of essential features of the present invention. For example, the present invention includes the following cases.

(1) Although, in the present embodiment and variations, the first element (a coefficient of a constant term) or the last element (a coefficient of (N−1) degree term) is determined as "0" at the time of signature generation and whether or not the element indicates "0" is verified at the time of signature verification, elements other than the aforementioned elements may be determined as "0". For example, the "i" th element ("i" is an integer ranging from 2 to (N−1)) may be set to "0". Furthermore, said element may be set to "j" ("j" is an integer ranging from 1 to (q−1)) instead of "0". Also, the element may be determined so as to be equal to one of the elements included in the polynomial m1. For example, the first element of the polynomial s' may be determined so as to be equal to the first element of the polynomial m1 at the time of signature generation, and whether or not the first element of the polynomial s' is equal to the first element of the polynomial m1 may be verified at the time of signature verification.

(2) The signature generation apparatus 110 and the signature verification apparatus 120 according to the aforementioned embodiment and variations specifically apply to a computer system which includes a micro processor, a Read Only Memory (ROM), a Random Access Memory (RAM), a hard disk unit, a display unit, a keyboard, and a mouse. A computer program is recorded in the RAM or the hard disk unit. The functions of the signature generation apparatus 110 and the signature verification apparatus 120 are realized by the operation of the micro processor in compliance with the computer program. Here, the computer program is configured as a combination of plural instruction codes indicating instructions for the computer to achieve predetermined functions.

(3) A part or all of the constituent elements of the signature generation apparatus 110 and the signature verification apparatus 120 according to the aforementioned embodiment and variations may be configured as a single Large Scale Integration (LSI). The system LSI is a super multi-function LSI which is manufactured by integrating plural constituent elements onto a single chip, and specifically is a computer system including a micro processor, a ROM, a RAM and the like. The computer program is stored in the RAM. The function of the system LSI is realized by the operation of the micro processor in compliance with the computer program.

(4) A part or all of the constituent elements of the signature generation apparatus 110 and the signature verification apparatus 120 according to the aforementioned embodiment and variations may be configured as a single module or an Integrated Circuit (IC) card detachable to/from the signature generation apparatus 110 or the signature verification apparatus 120. The IC card or the module is a computer system which is made up of a micro processor, a ROM, a RAM and the like. The IC card or the module may include the aforementioned super multi-function LSI. The function of the IC card or the module is realized by the operation of the micro processor in compliance with the computer program. This IC card or the module may have tamper resistance.

(5) The present invention is not only realized as a system and an apparatus in the digital signature system 100 according to the embodiment and variations, but also as a processing method thereof. Furthermore, the operation of the processing method may be realized as a computer program to be executed by the computer, and also as a digital signal configured of the computer program.

(6) Furthermore, the present invention may be realized by recording the computer program or the digital signal onto a computer readable recording medium such as a flexible disk, a hard disk, a Compact Disk Read Only Memory (CD-ROM), a Magneto-Optical (MO) disk, a Digital Versatile Disk (DVD), a DVD-ROM, a DVD-RAM, a Blu-ray (BD) Disc, a semiconductor memory or the like. Furthermore, it may be realized as the digital signal recorded on the recording medium.

(7) Furthermore, the present invention may be realized by transmitting the computer program or the digital signal via a telecommunication line, a wireless or wired communication line, a network represented by the Internet, a data broadcast, or the like.

(8) Furthermore, the present invention may be realized as a computer system having the micro processor and the memory. In this case, the computer program is recorded in the memory, and the micro processor operates in compliance with the computer program.

(9) Furthermore, the present invention may be realized as another independent computer system by transmitting the computer program or the digital signal recorded onto the recording medium or by transmitting the computer program or the digital signal via the network and the like.

(10) Furthermore, the present invention may be realized as a combination of the aforementioned embodiment and variations.

INDUSTRIAL APPLICABILITY

The signature generation apparatus and the signature verification apparatus of the present invention has an effect of preventing an occurrence of norm zero vector forgery attack in the NTRUSign signature scheme and the like, and is applicable, for example, to a digital signature system and the like.

The invention claimed is:

1. A signature generation apparatus which generates signature data for message data, using a signature scheme,
wherein the signature scheme includes:
a key generation step of
generating elements f and g of a ring R and an element Fq, with respect to the ring R and a positive integer q, the ring R being a set of N-dimensional arrays and defining addition, subtraction, multiplication and a norm which indicates a size of an element, the element Fq being an inverse number of f(mod q) which denotes a remainder obtained when f is divided by q,
generating, as a public key, an element h which is congruent, modulo q, to a product which is derived as a result of multiplying the element f and the element Fq,
generating elements F and G so as to satisfy f×G−g×F=q, where "×" denotes multiplication of the ring R, and
generating, as a private key, a set {f, g, F, G} which includes the four elements of f, g, F and G;
a signature generation step of generating the signature data for the message data, using the private key, the signature data being an element of the ring R; and
a signature verification step of verifying the signature data using the public key, and
said signature generation apparatus comprises:
a signature generation unit operable to generate the signature data for the message data using the private key, the signature data being the element of the ring R; and
a signature conversion unit operable to convert a format of the signature data without changing a norm of the signature data, so that a target sub-element indicates a predetermined value, the target sub-element being one of N sub-elements included in the signature data, and
a hash value generation unit operable to generate two N-dimensional arrays indicating a hash value for the message data,
wherein said signature conversion unit is operable to convert the format of the signature data so that the target sub-element indicates a value which is one of 2·N sub-elements included in the two N-dimensional arrays indicating the hash value, where "·" denotes multiplication of integers.

2. The signature generation apparatus according to claim 1, wherein said signature conversion unit is operable to convert the format of the signature data so that the target sub-element is an integer ranging from 0 to q−1.

3. The signature generation apparatus according to claim 1, wherein said signature conversion unit is operable to convert the format of the signature data so that the target sub-element indicates 0.

4. The signature generation apparatus according to claim 1, wherein said signature conversion unit is operable to convert the format of the signature data so that a sub-element indicates a predetermined value, the sub-element corresponding to a constant term of a polynomial indicated by the signature data.

5. The signature generation apparatus according to claim 1, wherein said signature conversion unit is operable to convert the format of the signature data by subtracting, from the signature data, a norm zero vector which is a vector having a norm of 0.

6. The signature generation apparatus according to claim 5, wherein said signature conversion unit is operable to subtract, from the signature data, the norm zero vector which is configured as an N-dimensional array in which all sub-elements indicate the same value.

7. The signature generation apparatus according to claim 1, wherein said hash value generation unit is operable to convert a format of each of the two N-dimensional arrays indicating a hash value for the message data, without changing a norm of the N-dimensional array so that a target sub-element indicates a predetermined value, the target sub-element being one of N sub-elements included in the N-dimensional array, and
said signature generation unit is operable to generate the signature data, using the hash value whose format has been converted by said hash value generation unit and the private key in which a format of each element of the set {f, g, F, G} is adjusted so that a target sub-element indicates a predetermined value, the target sub-element being one of the N sub-elements included in each element.

8. A signature verification apparatus which verifies signature data for message data, using a signature scheme,
wherein the signature scheme includes:
a key generation step of
generating elements f and g of a ring R and an element Fq, with respect to the ring R and a positive integer q, the ring R being a set of N-dimensional arrays and defining addition, subtraction, multiplication and a norm which indicates a size of an element, the element Fq being an inverse number of f(mod q) which denotes a remainder obtained when f is divided by q,
generating, as a public key, an element h which is congruent, modulo q, to a product which is derived as a result of multiplying the element f and the element Fq,
generating elements F and G so as to satisfy f×G−g×F=q, where "×" denotes multiplication of the ring R, and
generating, as a private key, a set {f, g, F, G} which includes the four elements of f, g, F and G;
a signature generation step of generating the signature data for the message data, using the private key, the signature data being an element of the ring R; and
a signature verification step of verifying the signature data using the public key, and
said signature verification comprises:
a signature format judgment unit operable to judge whether or not a target sub-element indicates a predetermined value, and when judging that the target sub-element does not indicate the predetermined value, determine the signature data as unauthorized data, the target sub-element being one of N sub-elements included in the signature data;
a signature verification unit operable to verify the signature data which is an element of the ring R, using the public key, and
a hash value generation unit operable to generate two N-dimensional arrays indicating a hash value for the message data,
wherein said signature format judgment unit is operable to judge whether or not the target sub-element indicates a value which is one of 2·N sub-elements included in the two N-dimensional arrays indicating the hash value, where "·" denotes multiplication of integers.

9. The signature verification apparatus according to claim 8,
wherein said signature format judgment unit is operable to judge whether or not the target sub-element is an integer which has been previously selected out of plural integers ranging from 0 to q−1.

10. The signature verification apparatus according to claim 8,
wherein said signature format judgment unit is operable to judge whether or not the target sub-element indicates 0.

11. The signature verification apparatus according to claim 8,
wherein said signature format judgment unit is operable to judge whether or not a sub-element corresponding to a constant term of a polynomial indicated by the signature data indicates a predetermined value.

12. The signature verification apparatus according to claim 8,
wherein said hash value generation unit is operable to convert a format of each of the two N-dimensional arrays without changing a norm of the N-dimensional array so that a target sub-element indicates a predetermined value, the target sub-element being one of the sub-elements included in the N-dimensional array, and
said signature verification unit includes:
a signature vector generation unit operable to: calculate, as an element t of the ring R, a product of the signature data and the public key in which a format is adjusted so that the target sub-element indicates a predetermined value, the target sub-element being one of N sub-elements included in the element h; convert a format of the element t without changing a norm of the element t so that a target sub-element indicates a predetermined value, the target sub-element being one of N sub-elements included in the element t; and generate a signature vector which is made up of the signature data and the element t whose format has been converted; and
a distance judgment unit operable to verify the signature data based on a distance between the signature vector generated by said signature vector generation unit and the hash value whose format has been converted by said hash value generation unit.

13. A signature generation method for generating signature data for message data, using a signature scheme,
wherein said signature scheme includes:
a key generation step of
generating elements f and g of a ring R and an element Fq, with respect to the ring R and a positive integer q, the ring R being a set of N-dimensional arrays and defining addition, subtraction, multiplication and a norm which indicates a size of an element, the element Fq being an inverse number of f(mod q) which denotes a remainder obtained when f is divided by q,
generating, as a public key, an element h which is congruent, modulo q, to a product which is derived as a result of multiplying the element f and the element Fq,
generating elements F and G so as to satisfy f×G−g×F=q, where "×" denotes multiplication of the ring R, and
generating, as a private key, a set {f, g, F, G} which includes the four elements of f, g, F and G;
a signature generation step of generating the signature data for the message data, using the private key, the signature data being an element of the ring R; and
a signature verification step of verifying the signature data using the public key, and said signature generation method comprises:
said signature generation step;
a signature conversion step of converting a format of the signature data without changing a norm of the signature data, so that a target sub-element indicates a predetermined value, the target sub-element being one of N sub-elements included in the signature data, and
a hash value generation step of generating two N-dimensional arrays indicating a hash value for the message data,
wherein, in said signature conversion step, the format of the signature data is converted so that the target sub-element indicates a value which is one of 2·N sub-elements included in the two N-dimensional arrays indicating the hash value, where "·" denotes multiplication of integers.

14. A signature verification method for verifying signature data for message data, using a signature scheme,
wherein the signature scheme includes:
a key generation step of
generating elements f and g of a ring R and an element Fq, with respect to the ring R and a positive integer q, the ring R being a set of N-dimensional arrays and defining addition, subtraction, multiplication and a norm which indicates a size of an element, the element Fq being an inverse number of f(mod q) which denotes a remainder obtained when f is divided by q,
generating, as a public key, an element h which is congruent, modulo q, to a product which is derived as a result of multiplying the element f and the element Fq,
generating elements F and G so as to satisfy f×G−g×F=q, where "×" denotes multiplication of the ring R, and
generating, as a private key, a set {f, g, F, G} which includes the four elements of f, g, F and G;
a signature generation step of generating the signature data for the message data, using the private key, the signature data being an element of the ring R; and
a signature verification step of verifying the signature data using the public key, and
said signature verification method comprises
a signature format judgment step of judging whether or not a target sub-element indicates a predetermined value, and when judging that the target sub-element does not indicate the predetermined value, determine the signature data as unauthorized data, the target sub-element being one of N sub-elements included in the signature data;
a signature verification step; and
a hash value generation step of generating two N-dimensional arrays indicating a hash value for the message data,
wherein, in said signature format judgment step, whether or not the target sub-element indicates a value which is one of 2·N sub-elements included in the two N-dimensional arrays indicating the hash value, is judged, where "·" denotes multiplication of integers.

15. A computer-readable recording medium on which a program is recorded, the program for generating signature data for message data using a signature scheme,
wherein the signature scheme includes:
a key generation step of
generating elements f and g of a ring R and an element Fq, with respect to the ring R and a positive integer q, the ring R being a set of N-dimensional arrays and defining addition, subtraction, multiplication and a norm which indicates a size of an element, the element Fq being an inverse number of f(mod q) which denotes a remainder obtained when f is divided by q, generating, as a public key, an element h which is congruent, modulo q, to a product which is derived as a result of multiplying the element f and the element Fq, generating elements F and G so as to satisfy f×G−g×F=q, where "×" denotes multiplication of the ring R, and generating, as a private key, a set {f, g, F, G} which includes the four elements of f, g, F and G;

a signature generation step of generating the signature data for the message data, using the private key, the signature data being an element of the ring R; and a signature verification step of verifying the signature data using the public key, and said program causes a computer to execute:

said signature generation step;

a signature conversion step of converting a format of the signature data without changing a norm of the signature data, so that a target sub-element indicates a predetermined value, the target sub-element being one of N sub-elements included in the signature data; and a hash value generation step of generating two N-dimensional arrays indicating a hash value for the message data, wherein, in said signature conversion step, the format of the signature data is converted so that the target sub-element indicates a value which is one of 2·N sub-elements included in the two N-dimensional arrays indicating the hash value, where "·" denotes multiplication of integers.

16. A computer-readable recording medium on which a program is recorded, the program for generating signature data for message data using a signature scheme, wherein the signature scheme includes:

a key generation step of generating elements f and g of a ring R and an element Fq, with respect to the ring R and a positive integer q, the ring R being a set of N-dimensional arrays and defining addition, subtraction, multiplication and a norm which indicates a size of an element, the element Fq being an inverse number of f(mod q) which denotes a remainder obtained when f is divided by q, generating, as a public key, an element h which is congruent, modulo q, to a product which is derived as a result of multiplying the element f and the element Fq, generating elements F and G so as to satisfy f×G−g×F=q, where "×" denotes multiplication of the ring R, and generating, as a private key, a set {f, g, F, G} which includes the four elements of f, g, F and G;

a signature generation step of generating the signature data for the message data, using the private key, the signature data being an element of the ring R; and a signature verification step of verifying the signature data using the public key, and said program causes a computer to execute:

a signature format judgment step of judging whether or not a target sub-element indicates a predetermined value, and when judging that the target sub-element does not indicate the predetermined value, determine the signature data as unauthorized data, the target sub-element being one of N sub-elements included the signature data;

said signature verification step; and a hash value generation step of generating two N-dimensional arrays indicating a hash value for the message data, wherein, in said signature format judgment step, whether or not the target sub-element indicates a value which is one of 2·N sub-elements included in the two N-dimensional arrays indicating the hash value, is judged, where "·" denotes multiplication of integers.

17. An integrated circuit which generates signature data for message data using a signature scheme, wherein the signature scheme includes:

a key generation step of generating elements f and g of a ring R and an element Fq, with respect to the ring R and a positive integer q, the ring R being a set of N-dimensional arrays and defining addition, subtraction, multiplication and a norm which indicates a size of an element, the element Fq being an inverse number of f(mod q) which denotes a remainder obtained when f is divided by q, generating, as a public key, an element h which is congruent, modulo q, to a product which is derived as a result of multiplying the element f and the element Fq, generating elements F and G so as to satisfy f×G−g×F=q, where "×" denotes multiplication of the ring R, and generating, as a private key, a set {f, g, F, G} which includes the four elements of f, g, F and G;

a signature generation step of generating the signature data for the message data, using the private key, the signature data being an element of the ring R; and a signature verification step of verifying the signature data using the public key, and said integrated circuit comprises:

a signature generation unit operable to generate the signature data for the message data using the private key, the signature data being the element of the ring R;

a signature conversion unit operable to convert a format of the signature data without changing a norm of the signature data, so that a target sub-element indicates a predetermined value, the target sub-element being one of N sub-elements included in the signature data; and a hash value generation unit operable to generate two N-dimensional arrays indicating a hash value for the message data, wherein said signature conversion unit is operable to convert the format of the signature data so that the target sub-element indicates a value which is one of 2·N sub-elements included in the two N-dimensional arrays indicating the hash value, where "·" denotes multiplication of integers.

18. An integrated circuit which verifies signature data for message data using a signature scheme, wherein the signature scheme includes:

a key generation step of generating elements f and g of a ring R and an element Fq, with respect to the ring R and a positive integer q, the ring R being a set of N-dimensional arrays and defining addition, subtraction, multiplication and a norm which indicates a size of an element, the element Fq being an inverse number of f(mod q) which denotes a remainder obtained when f is divided by q, generating, as a public key, an element h which is congruent, modulo q, to a product which is derived as a result of multiplying the element f and the element Fq, generating elements F and G so as to satisfy f×G−g×F=q, where "×" denotes multiplication of the ring R, and generating, as a private key, a set {f, g, F, G} which includes the four elements of f, g, F and G;

a signature generation step of generating the signature data for the message data, using the private key, the signature data being an element of the ring R; and a signature verification step of verifying the signature data using the public key, and said integrated circuit comprises:

a signature format judgment unit operable to judge whether or not a target sub-element indicates a predetermined value, and when judging that the target sub-element does not indicate the predetermined value, determine the signature data as unauthorized data, the target sub-element being one of N sub-elements included the signature data;

a signature verification unit operable to verify the signature data which is an element of the ring R, using the public key; and a hash value generation unit operable to generate two N-dimensional arrays indicating a hash value for the message data, wherein said signature format judgment unit is operable to judge whether or not the target sub-element indicates a value which is one of 2·N sub-elements included in the two N-dimensional arrays indicating the hash value, where "·" denotes multiplication of integers.

* * * * *